United States Patent
Reding et al.

(10) Patent No.: US 7,418,090 B2
(45) Date of Patent: Aug. 26, 2008

(54) METHODS AND SYSTEMS FOR CONFERENCE CALL BUFFERING

(75) Inventors: Craig L. Reding, Midland Park, NJ (US); John R. Reformato, East Meadow, NY (US); Ziauddin R. Majid, Irving, TX (US); Christopher L. Helbling, Stamford, CT (US); Brian F. Roberts, Lewisville, TX (US); Loren C. Swingle, Norwalk, CT (US)

(73) Assignee: Telesector Resources Group Inc., New York, NY (US)

( * ) Notice: Subject to any disclaimer, the term of this patent is extended or adjusted under 35 U.S.C. 154(b) by 0 days.

(21) Appl. No.: 10/720,859

(22) Filed: Nov. 24, 2003

(65) Prior Publication Data

US 2005/0053214 A1    Mar. 10, 2005

Related U.S. Application Data

(60) Provisional application No. 60/436,018, filed on Dec. 26, 2002, provisional application No. 60/428,704, filed on Nov. 25, 2002.

(51) Int. Cl.
*H04M 3/42* (2006.01)
(52) U.S. Cl. .................................. 379/202.01; 379/85
(58) Field of Classification Search ............ 379/202.01, 379/67.1, 88.01, 207.01, 157, 158; 348/14.09
See application file for complete search history.

(56) References Cited

U.S. PATENT DOCUMENTS

| | | | |
|---|---|---|---|
| 4,013,839 A | 3/1977 | Bell | |
| 4,540,850 A | 9/1985 | Herr et al. | 379/88.19 |
| 4,600,814 A | 7/1986 | Cunniff et al. | |
| 4,734,931 A | 3/1988 | Bourg et al. | |
| 4,924,496 A | 5/1990 | Figa et al. | |
| 5,222,125 A | 6/1993 | Creswell et al. | |
| 5,327,486 A | 7/1994 | Wolff et al. | 379/93.23 |
| 5,329,578 A | 7/1994 | Brennan et al. | |
| 5,428,663 A | 6/1995 | Grimes et al. | |

(Continued)

FOREIGN PATENT DOCUMENTS

EP    0818908    1/1998

(Continued)

OTHER PUBLICATIONS

U.S. Appl. No. 09/828,679, filed Apr. 6, 2001, Reding et al.

(Continued)

*Primary Examiner*—Olisa Anwah

(57) ABSTRACT

Methods and systems for conference call buffering are disclosed. Methods and systems consistent with the present invention record a conference call between a plurality of users. A service center in conjunction with a conference bridge and conference server establishes a conference call between a plurality of users. The service center may also ascertain the identities of a plurality of destination devices for an audio stream corresponding to the conference call, where the destination devices corresponding to the plurality of users. An audio streaming server provides the audio stream to the plurality of destination devices. Memory located centrally and/or local to the destination devices stores the audio stream. A user of one of the destination devices may choose to replay a selected portion of the audio stream.

86 Claims, 8 Drawing Sheets

U.S. PATENT DOCUMENTS

| | | | |
|---|---|---|---|
| 5,440,624 A * | 8/1995 | Schoof, II | 379/202.01 |
| 5,533,096 A | 7/1996 | Bales | |
| 5,588,037 A | 12/1996 | Fuller et al. | |
| 5,623,541 A | 4/1997 | Boyle et al. | |
| 5,631,904 A | 5/1997 | Fitser et al. | 370/261 |
| 5,638,434 A | 6/1997 | Gottlieb et al. | |
| 5,652,789 A | 7/1997 | Miner et al. | 379/201 |
| 5,715,444 A | 2/1998 | Danish et al. | |
| 5,719,925 A | 2/1998 | Peoples | |
| 5,724,412 A | 3/1998 | Srinivasan | |
| 5,742,095 A | 4/1998 | Bryant et al. | |
| 5,745,561 A | 4/1998 | Baker et al. | |
| 5,751,800 A | 5/1998 | Ardon | |
| 5,764,901 A * | 6/1998 | Skarbo et al. | 709/204 |
| 5,805,670 A | 9/1998 | Pons et al. | |
| 5,841,837 A | 11/1998 | Fuller et al. | |
| 5,864,603 A | 1/1999 | Haavisto et al. | |
| 5,872,841 A | 2/1999 | King et al. | |
| 5,875,242 A | 2/1999 | Glaser et al. | 379/207 |
| 5,903,845 A | 5/1999 | Buhrmann et al. | 455/461 |
| 5,907,547 A | 5/1999 | Foladare et al. | 370/352 |
| 5,920,847 A | 7/1999 | Kolling et al. | |
| 5,926,535 A | 7/1999 | Reynolds | |
| 5,944,769 A | 8/1999 | Musk et al. | |
| 6,031,896 A | 2/2000 | Gardell et al. | |
| 6,058,163 A | 5/2000 | Pattison et al. | |
| 6,061,432 A | 5/2000 | Wallace et al. | |
| 6,100,882 A * | 8/2000 | Sharman et al. | 704/235 |
| 6,134,318 A | 10/2000 | O'Neil | |
| 6,144,671 A | 11/2000 | Perinpanathan et al. | |
| 6,154,646 A | 11/2000 | Tran et al. | |
| 6,161,008 A | 12/2000 | Lee et al. | |
| 6,163,692 A | 12/2000 | Chakrabarti et al. | |
| 6,189,026 B1 | 2/2001 | Birrell et al. | |
| 6,192,123 B1 | 2/2001 | Grunsted et al. | 379/350 |
| 6,195,660 B1 | 2/2001 | Polnerow et al. | |
| 6,219,413 B1 | 4/2001 | Burg | 379/215.01 |
| 6,226,374 B1 | 5/2001 | Howell et al. | 379/207 |
| 6,240,449 B1 | 5/2001 | Nadeau | |
| 6,275,575 B1 | 8/2001 | Wu | |
| 6,282,522 B1 | 8/2001 | Davis et al. | |
| 6,298,062 B1 | 10/2001 | Gardell et al. | |
| 6,298,129 B1 * | 10/2001 | Culver et al. | 379/202.01 |
| 6,301,609 B1 | 10/2001 | Aravamudan et al. | 709/207 |
| 6,310,947 B1 | 10/2001 | Polcyn | 379/211.01 |
| 6,324,269 B1 | 11/2001 | Malik | |
| 6,349,299 B1 | 2/2002 | Spencer et al. | |
| 6,351,279 B1 | 2/2002 | Sawyer | |
| 6,363,143 B1 | 3/2002 | Fox | |
| 6,092,102 A1 | 4/2002 | Lefeber et al. | |
| 6,371,484 B1 | 4/2002 | Yuan | |
| 6,389,113 B1 | 5/2002 | Silverman | |
| 6,408,327 B1 | 6/2002 | McClennon et al. | |
| 6,411,605 B1 | 6/2002 | Vance et al. | |
| 6,418,214 B1 * | 7/2002 | Smythe et al. | 379/202.01 |
| 6,430,289 B1 | 8/2002 | Liffick | 379/900 |
| 6,442,245 B1 | 8/2002 | Castagna et al. | |
| 6,453,167 B1 | 9/2002 | Michaels et al. | |
| 6,459,780 B1 | 10/2002 | Wurster et al. | 379/142.02 |
| 6,463,145 B1 | 10/2002 | O'Neal et al. | 379/211.02 |
| 6,463,464 B1 | 10/2002 | Lazaridis et al. | |
| 6,466,910 B1 | 10/2002 | Desmond et al. | |
| 6,470,079 B1 | 10/2002 | Benson | |
| 6,477,374 B1 | 11/2002 | Shaffer et al. | 455/445 |
| 6,480,830 B1 | 11/2002 | Ford et al. | |
| 6,519,326 B1 | 2/2003 | Milewski et al. | |
| 6,535,596 B1 | 3/2003 | Frey et al. | |
| 6,539,082 B1 | 3/2003 | Lowe et al. | |
| 6,542,596 B1 | 4/2003 | Hill et al. | |
| 6,546,005 B1 | 4/2003 | Berkley et al. | 370/353 |
| 6,563,914 B2 | 5/2003 | Sammon et al. | |
| 6,564,261 B1 | 5/2003 | Gudjonsson et al. | 709/227 |
| 6,577,622 B1 | 6/2003 | Schuster et al. | 370/352 |
| 6,584,122 B1 | 6/2003 | Matthews et al. | 370/493 |
| 6,590,603 B2 * | 7/2003 | Sheldon et al. | 348/14.09 |
| 6,593,352 B2 | 7/2003 | Smith | |
| 6,614,786 B1 | 9/2003 | Byers | 370/353 |
| 6,625,258 B1 | 9/2003 | Ram et al. | |
| 6,654,768 B2 | 11/2003 | Celik | |
| 6,661,340 B1 | 12/2003 | Saylor et al. | |
| 6,665,388 B2 | 12/2003 | Bedingfield | |
| 6,683,939 B1 | 1/2004 | Chiloyan et al. | |
| 6,687,362 B1 | 2/2004 | Lindquist et al. | |
| 6,693,897 B1 | 2/2004 | Huang | |
| 6,697,796 B2 | 2/2004 | Kermani | |
| 6,704,294 B1 | 3/2004 | Cruickshank | |
| 6,717,938 B1 | 4/2004 | D'Angelo | |
| 6,724,887 B1 | 4/2004 | Eilbacher et al. | |
| 6,735,292 B1 | 5/2004 | Johnson | |
| 6,747,970 B1 | 6/2004 | Lamb et al. | |
| 6,771,949 B1 | 8/2004 | Corliss | |
| 6,775,546 B1 | 8/2004 | Fuller | |
| 6,788,775 B1 | 9/2004 | Simpson | |
| 6,792,092 B1 * | 9/2004 | Michalewicz | 379/202.01 |
| 6,807,258 B1 | 10/2004 | Malik | |
| 6,807,259 B1 | 10/2004 | Patel et al. | |
| 6,816,468 B1 * | 11/2004 | Cruickshank | 370/260 |
| 6,816,469 B1 | 11/2004 | Kung et al. | |
| 6,820,055 B2 * | 11/2004 | Saindon et al. | 704/235 |
| 6,842,460 B1 | 1/2005 | Olkkonen et al. | |
| 6,847,823 B2 | 1/2005 | Lehikoinen et al. | |
| 6,876,736 B2 | 4/2005 | Lamy et al. | |
| 6,882,838 B1 | 4/2005 | Lee et al. | |
| 6,885,742 B1 | 4/2005 | Smith | |
| 6,917,610 B1 | 7/2005 | Kung et al. | |
| 6,947,538 B2 | 9/2005 | Shen et al. | |
| 6,954,521 B2 | 10/2005 | Bull et al. | |
| 6,958,984 B2 | 10/2005 | Kotzin | |
| 6,996,227 B2 | 2/2006 | Albal et al. | |
| 6,996,370 B2 | 2/2006 | DeLoye et al. | |
| 7,027,435 B2 | 4/2006 | Bardehle | |
| 7,065,198 B2 * | 6/2006 | Brown et al. | 379/202.01 |
| 7,076,528 B2 | 7/2006 | Premutico | |
| 7,116,972 B1 | 10/2006 | Zhang et al. | |
| 7,174,301 B1 | 2/2007 | Haseltine | |
| 2001/0003202 A1 | 6/2001 | Mache et al. | |
| 2001/0014863 A1 | 8/2001 | Williams, III | |
| 2001/0056466 A1 | 12/2001 | Thompson et al. | |
| 2002/0012425 A1 | 1/2002 | Brisebois et al. | |
| 2002/0018550 A1 | 2/2002 | Hafez | |
| 2002/0046299 A1 | 4/2002 | Lefeber et al. | |
| 2002/0055351 A1 | 5/2002 | Elsey et al. | |
| 2002/0069060 A1 | 6/2002 | Cannavo et al. | |
| 2002/0071539 A1 | 6/2002 | Diament et al. | |
| 2002/0075306 A1 | 6/2002 | Thompson et al. | |
| 2002/0076026 A1 | 6/2002 | Batten | |
| 2002/0076027 A1 | 6/2002 | Bernnan et al. | |
| 2002/0077082 A1 | 6/2002 | Cruickshank | |
| 2002/0080942 A1 | 6/2002 | Clapper | 379/201.01 |
| 2002/0083462 A1 | 6/2002 | Arnott | 348/14.08 |
| 2002/0085687 A1 | 7/2002 | Contractor et al. | |
| 2002/0103898 A1 | 8/2002 | Moyer et al. | |
| 2002/0110121 A1 | 8/2002 | Mishra | 370/389 |
| 2002/0115471 A1 | 8/2002 | DeLoye et al. | |
| 2002/0137530 A1 | 9/2002 | Karve | |
| 2002/0147777 A1 | 10/2002 | Hackbarth et al. | |
| 2002/0147811 A1 | 10/2002 | Schwartz et al. | 709/225 |
| 2002/0177410 A1 | 11/2002 | Klein et al. | |
| 2003/0014488 A1 * | 1/2003 | Dalal et al. | 709/204 |
| 2003/0035381 A1 | 2/2003 | Chen et al. | |
| 2003/0036380 A1 | 2/2003 | Skidmore | |
| 2003/0045309 A1 | 3/2003 | Knotts | |
| 2003/0046071 A1 * | 3/2003 | Wyman | 704/235 |
| 2003/0055906 A1 | 3/2003 | Packham et al. | |

| | | | |
|---|---|---|---|
| 2003/0058838 A1 | 3/2003 | Wengrovitz | 370/352 |
| 2003/0069874 A1 | 4/2003 | Hertzog et al. | |
| 2003/0092451 A1 | 5/2003 | Holloway et al. | |
| 2003/0096626 A1 | 5/2003 | Sabo et al. | |
| 2003/0104827 A1 | 6/2003 | Moran et al. | |
| 2003/0108172 A1 | 6/2003 | Petty et al. | |
| 2003/0112928 A1 | 6/2003 | Brown et al. | |
| 2003/0147518 A1 | 8/2003 | Albal et al. | |
| 2003/0165223 A1 | 9/2003 | Timmins et al. | |
| 2003/0169330 A1* | 9/2003 | Ben-Shachar et al. | 348/14.09 |
| 2004/0002350 A1 | 1/2004 | Gopinath et al. | |
| 2004/0019638 A1 | 1/2004 | Makagon et al. | 709/204 |
| 2004/0034700 A1 | 2/2004 | Polcyn | |
| 2004/0044658 A1 | 3/2004 | Crabtree et al. | |
| 2004/0081292 A1* | 4/2004 | Brown et al. | 379/68 |
| 2004/0103152 A1* | 5/2004 | Ludwig et al. | 709/205 |
| 2004/0119814 A1* | 6/2004 | Clisham et al. | 348/14.08 |
| 2004/0127256 A1 | 7/2004 | Goldthwaite et al. | |
| 2004/0184593 A1 | 9/2004 | Elsey et al. | |
| 2004/0203942 A1 | 10/2004 | Dehlin | |
| 2004/0236792 A1 | 11/2004 | Celik | |
| 2004/0247088 A1 | 12/2004 | Lee | |
| 2004/0249884 A1* | 12/2004 | Caspi et al. | 709/204 |
| 2005/0129208 A1 | 6/2005 | McGrath et al. | |
| 2005/0149487 A1 | 7/2005 | Celik | |
| 2007/0021111 A1 | 1/2007 | Celik | |

FOREIGN PATENT DOCUMENTS

| | | |
|---|---|---|
| EP | 0818908 A3 | 1/1998 |
| JP | 59-169264 | 9/1984 |
| JP | 2000-270307 | 9/2000 |
| WO | WO01/11586 | 2/2001 |
| WO | WO 01/11586 A1 | 2/2001 |
| WO | WO 01/35621 | 5/2001 |
| WO | WO 01/89212 | 11/2001 |

OTHER PUBLICATIONS

U.S. Appl. No. 09/785,223, filed Feb. 16, 2001, Swingle et al.
"MP3 Recorder Download—MP3 Recorder—Record Audio Stream to MP3 or WAV," 2002 http://www.mp3-recorder.net.
"FAQ Premium Home Answer" eVoice, http://content.evoice.com/wcs/signUp/FAQ_premHA_s01.htm.
"Voice-ASP, White Paper Technology & Processes," eVoice, Dec. 13, 2000.
"Voice-ASP, White Paper: Market Opportunities for Enhanced Voicemail," eVoice, Nov. 10, 2000.
"Audio Digitizing Process," TalkBank, http://www.talkbank.org/da/audiodig.html.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
"Macromedia SoundEdit 16 Support Center-Working with Other Programs, What is Shockwave Audio Streaming?" http://www.macromedia.com/support/soundedit/how/shock/whatis.html.
"Chapter 3: Overview," last updated Dec. 2, 1999, http://service.real.com/help/library/guides/g270/htmfiles/overview.htm.
"How Internet Radio Works," Howstuffworks, http://computer.howstuffworks.com/internet-radio.htm/printable.
"Telecommunications and Personal Management Services Linked in Collaboration by Verizon and Microsoft," Oct. 23, 2001, http://www.microsoft.com/presspass/press/2001/oct01/10-23MSVerizonPr.asp.
"Real-Time Collaboration Integration in the Portal," T. Odenwald, SAP Design Guild, http://www.sapdesignguild.org/editions/edition5/synch_collab.asp.
"NetMeeting101," http://www.meetingbywire.com/NetMeeting101.htm.
"NetMeeting102," http://www.meetingbywire.com/NetMeeting102.htm.
"Instructions on Application Sharing and Data Collaboration," VCON Escort and Cruiser, http://www.vide.gatech.edu/docs/share/.
"Instructions on Multipoint Application Sharing and Data Collaboration," VCON Escort and Cruiser with the RadVision MCU, http://www.vide.gatech.edu/docs/multi-share/.
"File Transfer," Microsoft Windows Technologies Windows NetMeeting, last updated Jun. 4, 1999, http://www.microsoft.com/windows/netmeeting/features/files/default.asp.
"From Dial Tone to Media Tone," Analyst: R. Mahowald, IDC, Jun. 2002.
"MediaTone—The 'Dial Tone' for Web Communications Services," Webex, 2003.
Business Solutions/Professional, http://www.accessline.com/business_sol/bs_professional_body.html.
"Accessline Comms' Accessline Service, The One-Number Wonder," CommWeb, T. Kramer, Feb. 1, 2000, http://www.cconvergence.com/article/TCM20000504S0014.
"InteleScreener," 2003, http://www.intelescreener.com/howitworks.html.
"TeleZapper from Privacy Technologies," Privacy Corps—Our Review, 2002, http://www.privacycorps.com/pages/product1.htm.
"A Proposal for Internet Call Waiting Service Using SIP," A. Brusilovsky et al., Lucent Technologies, PINT Working Group, Internet Draft, Jan. 1999.
"A Model for Presence and Instant Messaging", M. Day, et al. Fujitsu, Feb. 2000, Network Working Group, Request for Comments 2778.
"Chapter 3: Overview," last updated Dec. 2, 1999, http://service.real.com/help/library/guides/g270/htmfiles/overview.htm.
"A Model for Presence and Instant Messaging," M. Day et al., Fujitsu, Feb. 2000, Network Working Group, Request for Comments 2778.
Data Connection, Strategic Computer Technology, MeetingServer, "Broadband for Learning Case Study," Data Connection Ltd, 1998-2004, http://www.dataconnection.com/conferencing/meetingserver_casestudy.htm.
Data Connection, MailNGen, "Next Generation Messaging for Service Providers," Data Connection Limited, 2003-4.
Data Connection, Strategic Computer Technology, "Directions Explained," Data Connection Ltd, 1998-2004, http://www.dataconnection.com/inetapps/direxpl.htm.
Data Connection, Strategic Computer Technology, Directory Systems, "Directories and Meta-Directories," Data Connection Ltd, 1998-2004, http://www.dataconnection.com/inetapps/directory.htm.
Data Connection, Strategic Computer Technology, "DC-IMC\Voice Unified Messaging Gateway," Data Connection Ltd, 1998-2000, http://web.archive.org/web/20010307174512/www.dataconnection.com/messging/spivoice.htm.
Data Connection, Strategic Software Technology, "DC-SurroundSuite for Service Providers," Data Connection Ltd, 1998-2000, http://web.archive.org/web/20000914200355/www.dataconnection.com/messging/spssuite.htm.
Data Connection, Strategic Computer Technology, "Messaging Software Products and Services," Data Connection Ltd, 1998-2000, http://web.archive.org/web/20000819063320/www.dataconnection.com/messging/messgidx.htm.
Data Connection, Strategic Software Technology, "DC-Share for UNIX," Data Connection Ltd, 1998-2000, http://web.archive.org/web/20000914200713/www.dataconnection.com/conf/DCshare.htm.
Data Connection, Strategic Software Technology, "DC-H.323," Data Connection Ltd, 1998-2000, http://web.archive.org/web/20001120050600/www.dataconnection.com/conf/h323.htm.
Data Connection, Strategic Software Technology, "DC-WebShare," Data Connection Ltd, 1998-2000, http://web.archive.org/web/20001016115016/www.dataconnection.com/conf/webshare.htm.
Data Connection, Strategic Computer Technology, "DC-Recorder," Data Connection Ltd, 1998-2000, http://web.archive.org/web/20001016055611/www.dataconnection.com/conf/recorder.htm.
Data Connection, Strategic Software Technology, "DC-MeetingServer," Data Connection Ltd, 1998-2000, http://web.archive.org/web/20000914200719/www.dataconnection.com/conf/meetingserver.htm.
Data Connection, Strategic Computer Technology, "DC-MeetingServer," Data Connection Ltd, 1998-2000, http://web.archive.org/web/20021201144529/www.dataconnection.com/inetapps/conferencing.htm.

Data Connection, Strategic Software Technology, "DC-VoiceNet Features," Data Connection Ltd, 1998-2000, http://web.archive.org/web/20001016102614/www.dataconnection.com/messging/vnfeat.htm.

Data Connection, Strategic Software Technology, "DC-VoiceNet," Data Connection Ltd, 1998-2000, http://web.archive.org/web/20000914200424/www.dataconnection.com/messging/vnet.htm.

Data Connection, Strategic Computer Technology, "Messaging Software Products and Services," Data Connection Ltd, 1998-2000, http://web.archive.org/web/20010305143803/www.dataconnection.com/messging/messgidx.htm.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the integration of heterogeneous voicemail systems," Michael James, Internet Applications Group, Data Connection Ltd., 2004.

Data Connection, Strategic Computer Technology, "MailNGen: Next generation messaging for Service Providers," Data Connection Ltd, 1998-2004, http://www.dataconnection.com/messaging/.

Data Connection, Strategic Computer Technology, "MailNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers," Data Connection Ltd, 1998-2005, http://www.dataconnection.com/conferencing/.

Data Connection, Strategic Computer Technology, "MeetingServer: The web conferencing solution for Service Providers," Data Connection Ltd, 1998-2004, http://www.dataconnection.com/conferencing/meetingserver.htm.

Data Connection, Strategic Computer Technology, "MeetingServer: Web conferencing architecture," Data Connection Ltd, 1998-2004, http://www.dataconnection.com/conferencing/meetingserver_arch.htm.

"The Mobile Phone User Guide", http://www.mobileshop.org/usertech/wildfire.htm, printed Oct. 1, 2004.

Komowski, J., "Wildfire at Your Back and Call-A Voice-Activated Telephone Assistant That Minds You and Your Messages", http://www.lacba.org/lalawyer/techwildfire.html, pronted Oct. 1, 2004.

Cisco Personal Assistant 1.4, Cisco Systems, Jun. 24, 2003, http://www.cisco.com/en/US/products/sw/voicesw/ps2026/prod_presentation_list.html, printed Oct. 1, 2004.

* cited by examiner

METHODS AND SYSTEMS FOR CONFERENCE CALL BUFFERING

RELATED APPLICATIONS

Applicants claim the right to priority under 35 U.S.C. § 119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/083,792, entitled "VOICE MAIL INTEGRATION WITH INSTANT MESSENGER," filed Feb. 27, 2002; U.S. patent application Ser. No. 10/083,884, entitled "DEVICE INDEPENDENT CALLER ID," filed Feb. 27, 2002, and U.S. patent application Ser. No. 10/083,822 entitled "METHOD AND APPARATUS FOR A UNIFIED COMMUNICATION MANAGEMENT VIA INSTANT MESSAGING," filed Feb. 27, 2002; U.S. patent application Ser. No. 10/083,793 entitled "METHOD AND APPARATUS FOR CALENDARED COMMUNICATIONS FLOW CONTROL," filed Feb. 27, 2002; U.S. patent application Ser. No. 10/084,121, entitled "CALENDAR-BASED CALLING AGENTS," filed Feb. 27, 2002; U.S. patent application Ser. No. 10/720,661, entitled "METHODS AND SYSTEMS FOR DRAG AND DROP CONFERENCE CALLING," U.S. patent application Ser. No. 10/721,009, entitled "METHODS AND SYSTEMS FOR COMPUTER ENHANCED CONFERENCE CALLING," U.S. patent application Ser. No. 10/720,943, entitled "METHODS AND SYSTEMS FOR REMOTE CALL ESTABLISHMENT," U.S. patent application Ser. No. 10/721,005, entitled "METHODS AND SYSTEMS FOR CALL MANAGEMENT WITH USER INTERVENTION," U.S. patent application Ser. No. 10/720,868, entitled "METHODS AND SYSTEMS FOR DIRECTORY INFORMATION LOOKUP," U.S. patent application Ser. No. 10/720,970, entitled "METHODS AND SYSTEMS FOR AUTOMATICALLY FORWARDING CALLS TO CELL PHONE," U.S. patent application Ser. No. 10/720,952, entitled "METHODS AND SYSTEMS FOR ADAPTIVE MESSAGE AND CALL NOTIFICATION," U.S. patent application Ser. No. 10/720,870, entitled "METHODS AND SYSTEMS FOR A CALL LOG," U.S. patent application Ser. No. 10/720,633, entitled "METHODS AND SYSTEMS FOR AUTOMATIC FORWARDING OF CALLS TO A PREFERRED DEVICE," U.S. patent application Ser. No. 10/720,971, entitled "METHODS AND SYSTEMS FOR MULTI-LINE INTEGRATED DEVICE OR LINE MANAGEMENT," U.S. patent application Ser. No. 10/720,784, entitled "METHODS AND SYSTEMS FOR CONTACT MANAGEMENT," U.S. patent application Ser. No. 10/720,920, entitled "METHODS AND SYSTEMS FOR NOTIFICATION OF CALL TO PHONE DEVICE," U.S. patent application Ser. No. 10/720,825, entitled "METHODS AND SYSTEMS FOR SINGLE NUMBER TEXT MESSAGING," U.S. patent application Ser. No. 10/720,944, entitled "METHODS AND SYSTEMS FOR MULTI-USER SELECTIVE NOTIFICATION," U.S. patent application Ser. No. 10/720,933, entitled "METHODS AND SYSTEMS FOR CPN TRIGGERED COLLABORATION," and U.S. patent application Ser. No. 10/720,928, entitled "METHODS AND SYSTEMS FOR PREEMPTIVE REJECTION OF CALLS," all of which are expressly incorporated herein by reference in their entirety.

TECHNICAL FIELD

The present invention relates generally to data processing systems and, more particularly, to a method and system for providing conference call buffering.

BACKGROUND

A wide variety of means exist for communication between users. For example, a user may conduct phone calls via a home phone, work phone, and mobile phone. In addition, users may also communicate using devices such as PC's, PDA's, pagers, etc. using manners of communicating such as email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

A user may also wish to treat a phone call differently dependent on who is calling the user. For example, if a user receives a call from a caller that the user does not want to speak to at the moment, the user may want to send that call directly to voice mail. Also, if a user receives a call from a number that displays no caller ID information or that the user otherwise does not recognize, the user may wish to somehow specially treat the call because the caller is a potential telemarketer.

Further relating to communication between users, a wide variety of means also exist for establishing a conference call between three or more users. For example, one method for establishing a conference call involves having one user call other users (e.g., conference users) and bridging each user onto the conference call. This method requires that the initiating user individually call each conference user.

Another method for establishing a conference call involves using a conference telephone number to which conference users dial in to join the conference call. This method requires that each participant know of the conference call beforehand and requires that a dial-number and access code be assigned to the conference call beforehand.

Yet another method for establishing a conference call involves establishing a predetermined list of conference users and initiating a conference call to the list of participants at the request of an initiating user. The voice network bridges calls to the conference users to establish the conference call.

Problems often arise during conference calls when one or more of the conference users joins the conference call late, needs to take a break from the conference call, or otherwise misses part of the conference call. Namely, a conference user is not aware of what was discussed while the user was absent.

SUMMARY OF THE INVENTION

Methods and systems consistent with the present invention record a conference call between a plurality of users. A service center establishes a conference call between a plurality of users. The service center may also ascertain the identities of a plurality of destination devices for an audio stream corresponding to the conference call, where the destination devices corresponding to the plurality of users. An audio streaming server provides the audio stream to the plurality of destination devices. Memory located centrally and/or local to the destination devices stores the audio stream. A user of one of the destination devices may choose to replay a selected portion of the audio stream.

Other methods and systems consistent with the present invention also record a conference call between a plurality of users. A service center establishes a conference call between a plurality of users. The service center may also ascertain the identities of a plurality of destination devices for an audio stream corresponding to the conference call, where the destination devices corresponding to the plurality of users. Moreover, the service center provides the audio stream to the plurality of destination devices. A central memory stores the audio stream.

Other methods and systems consistent with the present invention also record a conference call between a plurality of users. A device corresponding to one of the plurality of users receives, from a service center, an audio stream corresponding to a conference call between a plurality of users, including an initiating user. The device may also store the received audio stream and replay a selected portion of the audio stream. The service center establishes the conference call between the plurality of users, ascertains identities of a plurality of destination devices for the audio stream corresponding to the conference call, and provides the audio stream to the plurality of destination devices.

BRIEF DESCRIPTION OF THE DRAWINGS

The accompanying drawings, which are incorporated in and constitute a part of this specification, illustrate one embodiment of the invention and, together with the description, serve to explain the principles of the invention.

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

System Overview

Methods and systems consistent with certain aspects of the present invention record a conference call between a plurality of users. A service center in conjunction with a conference bridge and conference server establishes a conference call between a plurality of users. The service center may also ascertain the identities of a plurality of destination devices for an audio stream corresponding to the conference call, where the destination devices corresponding to the plurality of users. An audio streaming server provides the audio stream to the plurality of destination devices. Memory located centrally and/or local to the destination devices stores the audio stream. As used herein, the term audio stream may generally refer to network-delivered audio data that may be immediately or almost immediately rendered to sound, if so desired, upon its arrival to a device.

A user of one of the destination devices may choose to replay a selected portion of the audio stream. The user may provide an indication of an amount of the audio stream to play, as well as a speed. As such, replay of the audio stream may comprise playing a user-selected amount of audio at a user-selected speed. In this manner, a user that misses a portion of a conference call in which the user is invited to participate may listen to a specified portion of the audio associated with the conference call. The user may choose to listen to the audio at faster than normal speed in order to more rapidly get up to speed on the content of the replay.

Network Environment

Figure 1:
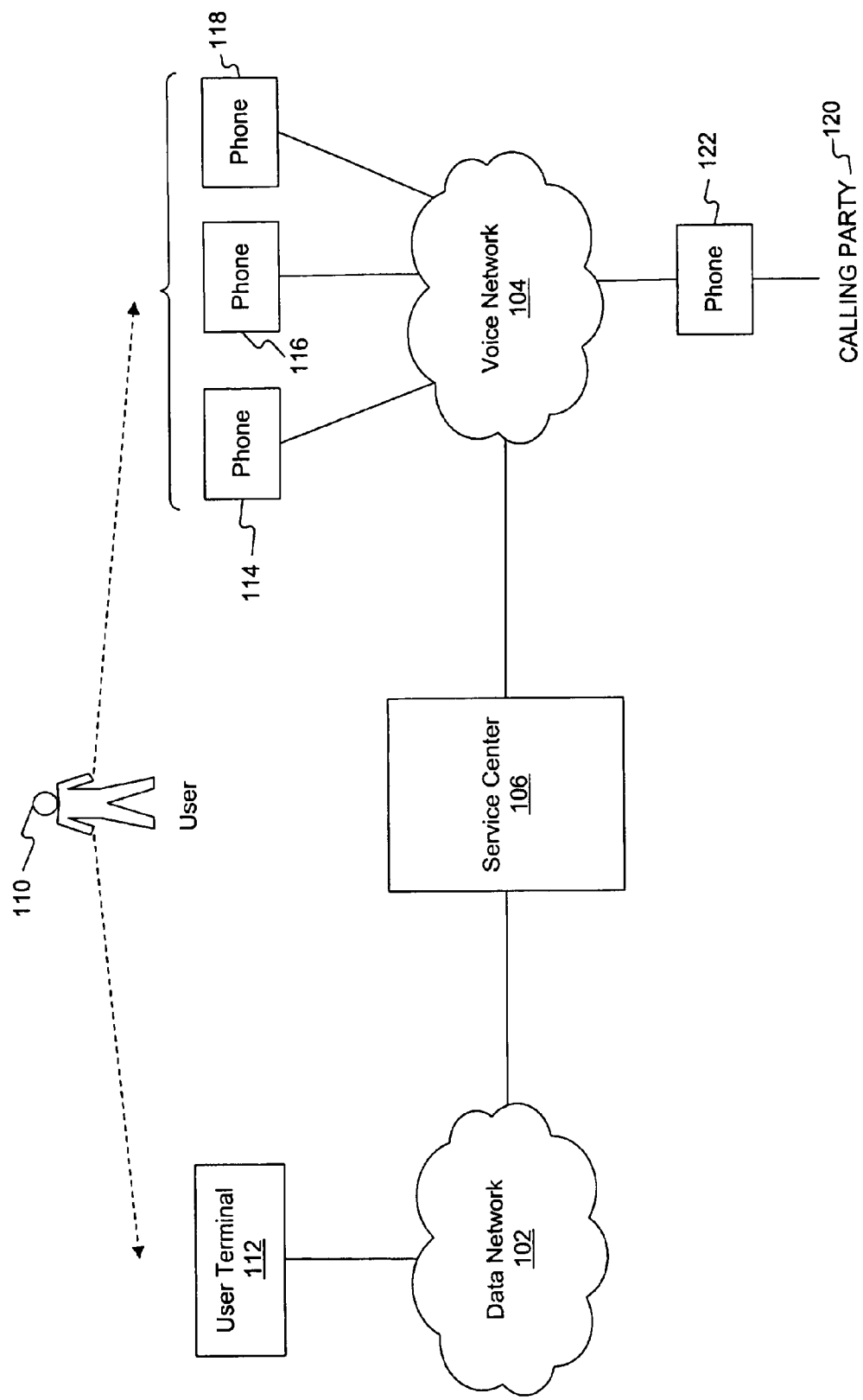
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. Calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a Wide Area Network ("WAN"), Local Area Network ("LAN"), an intranet and/or the Internet. Further, service center 106 may be connected to multiple data networks 102, such as, for example, to a wireless carrier network and to the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented on a voice over broadband network, such as a network using voice-over Internet Protocol ("VoIP") technology. Additionally, in other embodiments, the voice network may be a video over broadband network, such as, for example, a network for providing 2-way video communications. In another example, the voice network may be a wireless broadband network, such as, for example, a network using WiFi (i.e., IEEE 802.11(b) and/or (g)). In yet another example, voice network 104 may be a wireless voice network(s), such as, for example, a cellular or third-generation cellular network). In addition, voice network 104 may be implemented using any single or combination of the above-described technologies consistent with the principles of the present invention. Further, service center 106 may be connected to multiple voice networks 104, such as for example, Verizon'S™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 with an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDAs") with network connections.

User terminal 112 also allows user 110 to communicate with service center 106. For example, user 110 may use Instant Messaging ("IM") to communicate with service center 106. In addition, user terminal 112 may use other aspects of TCP/IP including the Hypertext Transfer Protocol ("HTTP"); the User Datagram Protocol ("UDP"); the File Transfer Protocol ("FTP"); the Hypertext Markup Language ("HTML"); and the extensible Markup Language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a Private Branch Exchange ("PBX"), may be interposed between phones 114, 116, 118, and 122 and voice network 104.

Figure 2:
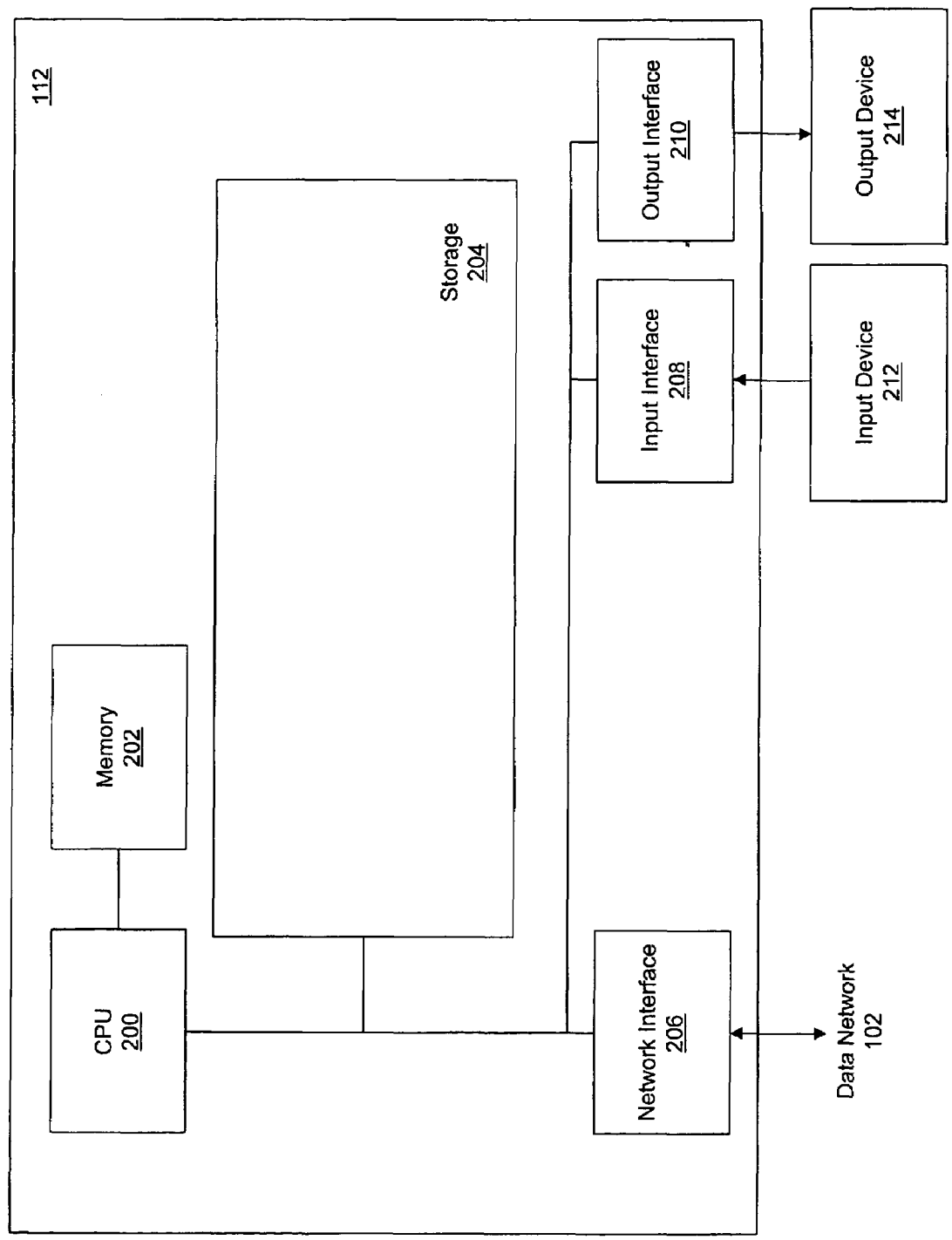
FIG. 2 is a diagram of an exemplary user terminal, consistent with the principals of the present invention.

FIG. 2 is a block diagram of a user terminal consistent with the present invention. User terminal 112 may include a Central Processing Unit ("CPU") 200, a memory 202, a storage module 204, a network interface 206, an input interface 208, an output interface 210, an input device 212, and an output device 214.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation™.

Memory 202 provides a primary memory for CPU 200, such as for program code. Memory 202 may be embodied with a variety of components of subsystems, including a Random Access Memory ("RAM") and a Read-Only Memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, data structures or program code for a calendar application, such as GroupWise™ provided by Novell Corporation™ or Outlook provided by Microsoft Corporation™; a client application, such as a Microsoft Network Messenger Service ("MSNMS") client or America Online Instant Messenger (AIM) client; and an Operating System ("OS"), such as the Windows Operation System provided by Microsoft Corporation. In addition, storage module 204 may include other program code and information, such as program code for TCP/IP communications; kernel and device drivers; configuration information, such as a Dynamic Host Configuration Protocol ("DHCP") configuration; a web browser, such as Internet Explorer™ provided by Microsoft Corporation, or Netscape Communicator™ provided by Netscape Corporation™; and any other software that may be installed on user terminal 112.

Network interface 206 provides a communications interface between user terminal 112 and data network 102. Network interface 206 may receive and transmit communications for user terminal 112. For example, network interface 206 may be a modem, or a LAN port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
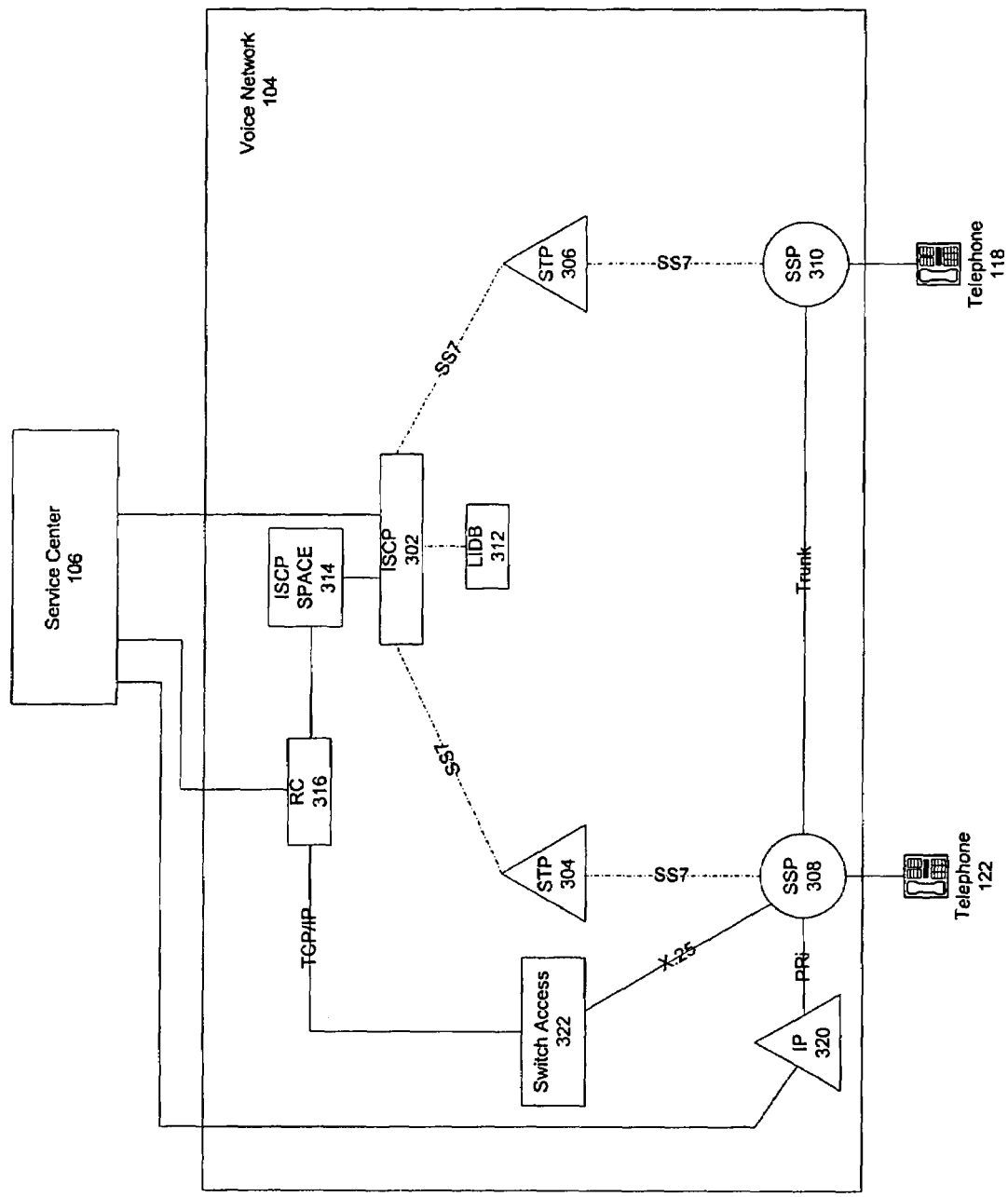
FIG. 3 is a diagram of a voice network, consistent with the principles of the present invention.

FIG. 3 is a diagram of a voice network, consistent with the principles of the present invention., As shown, voice network 104 includes an Intelligent Service Control Point ("ISCP") 302, Service Transfer Points ("STP") 304 and 306, service switching points ("SSP") 308 and 310, a Line Information Database ("LIDB") 312, an ISCP Service Provisioning And Creation Environment ("SPACE") 314, a Recent Change Environment ("RCE") 316, an Intelligent Peripheral ("IP") 320, and a switch access 322. Although this embodiment of a voice network 104 is described as a PSTN, as discussed above in other embodiments, voice network 104 may be, for example, a voice or video over broadband network a wireless broadband, a wireless voice network, etc.

Voice network 104 may be implemented using the PSTN and SS7 as a signaling protocol. The SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point ("SCP") or an Advanced Intelligent Network ("AIN") SCP. ISCP 302 provides translation and routing services of SS7 messages to support the features of voice network 104, such as call forwarding. In addition, ISCP 302 may exchange information with service center 106 using TCP/IP or SS7. ISCP 302 may include service logic used to provide a switch, such as SSP 308 or 310, with specific call processing instructions. ISCP 302 may also store data related to various features that a user may activate. Such features may include, for example, call intercept and voice mail. ISCP 302 may be implemented using a combination of known hardware and software. ISCP 302 is shown with a direct connection to service center 106 and a connection to ISCP SPACE 314, however, any number of network elements including routers, switches, hubs, etc., may be used to connect ISCP 302, ISCP SPACE 314, and service center 106. Further, information exchanged between ISCP 302 and service center 106 may use, for example, the SR-3389 General Data Interface ("GDI") for TCP/IP.

STPs 304 and 306 relay SS7 messages within voice network 104. For example, STP 304 may route SS7 messages between SSPs 308 and 310. STP 302 may be implemented using known hardware and software from manufacturers such as NORTEL™ and LUCENT Technologies™.

SSPs 308 and 310 provide an interface between voice network 104 and phones 122 and 118, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within Message Signal Units ("MSU") to control calls, perform database queries to configuration database 312, and provide maintenance information.

LIDB 312 comprises one or more known databases to support the features of voice network 104. For example, LIDB 312 may include subscriber (i.e., a user that is a customer of a business entity providing services through one or more components of environment 100) information, such as a service profile, name and address, and credit card validation information. Although, in this figure, LIDB 312 is illustrated as directly connected to ISCP 302, LIDB 312 may be connected to ISCP 302 through an STP (e.g., 304 and 306).

Additionally, this communication link may use, for example, the GR-2838 General Dynamic Interface ("GDI") for SS7.

ISCP SPACE 314 may be included as part of ISCP 302 or be separate from ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in ISCP SPACE 314 such that the records may be updated and sent to ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more recent change engines 316 such as, for example, an Enterprise Recent Change engine ("eRC"); an Assignment, Activation, and Inventory System ("AAIS"); or a Multi-Services Platform ("MSP"). As an example, the eRC and AAIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP or eRC may be used, for example, for providing updates to both SSPs 308 or 310 and ISCPs 302. Or, for example, an eRC may be used for providing updates to SSPs 308 or 310, while an AAIS is used for providing updates to ISCPs 302.

Updates sent to SSPs 308 or 310 may be sent from the recent change engine 316 via a switch access 322 that may, for example, convert the updates into the appropriate protocol for SSP 308 or 310. For example, recent change engine 316 may send updates to SSPs 308 or 310 via TCP/IP. Switch access 322 may then convert the updates from TCP/IP to X.25. This switch access 322 may be implemented using hardware and/or software. These connections may include any number of elements, such as, for example, switches, routers, hubs, etc. and may be, for example, an internal data network for voice network 104.

Voice network 104 may also include one or more IPs. For example, in FIG. 3, an IP 320 is illustrated as being connected to SSP 308. These IPs may be used for providing functions for interaction between users and the voice network, such as voice mail services, digit collection, customized announcements, voice recognition, etc. Moreover, the communications between SSP 308 and IP 320 may use the Primary Rate interface ("PRi") (e.g., the 1129 protocol) protocol. Additionally, the IP 320 may be capable of sending and receiving information to/from the Service Center 106. These communications may use, for example, the SR-3511 protocol. Further, although FIG. 3 illustrates this connection as a direct connection, this connection may include any number of elements including routers, switches, hubs, etc., and may be via, for example, an internal data network for voice network 104.

Figure 4:
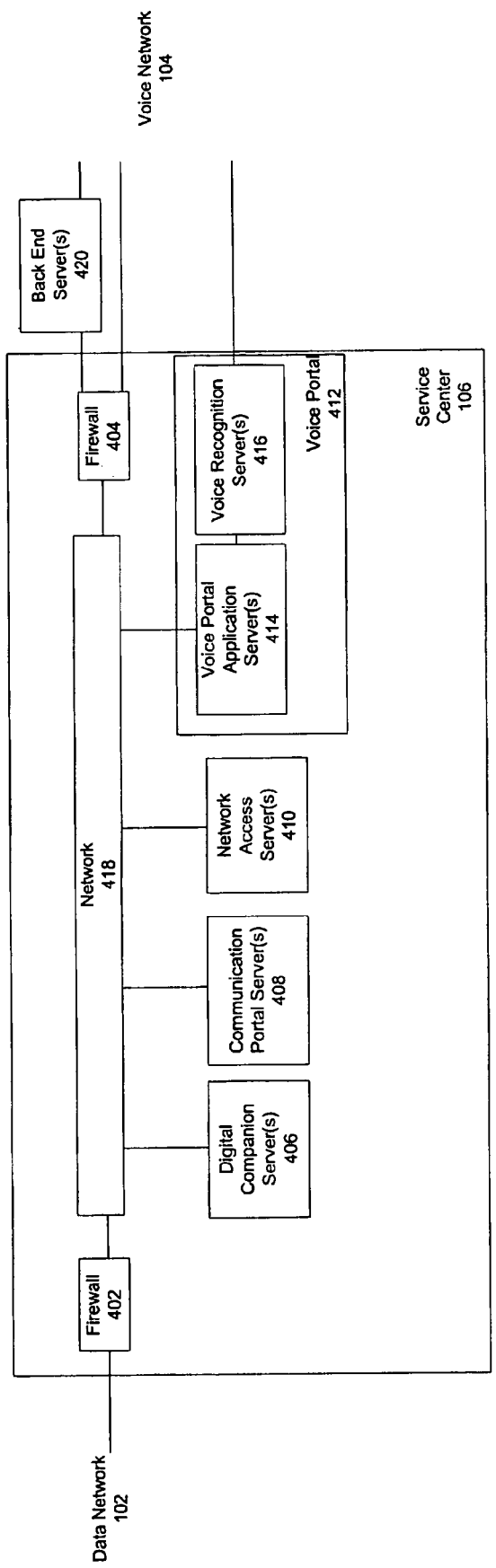
FIG. 4 is a block diagram of a service center, consistent with the principles of the present invention.

FIG. 4 is a block diagram of a service center, consistent with the principles of the present invention. As shown, service center 106 may include firewalls 402 and 404, one or more digital companion servers 406, one or more communication portal servers 408, one or more network access servers 410, and a voice portal 412. Voice portal 412 may include a voice portal application server 414 and a voice recognition server 416. A network 418 may be used to interconnect the firewalls and servers. Additionally, back end server(s) 420 may be provided between service center 106 and voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any appropriate security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any appropriate type of network, such as an Ethernet or FDDI network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, 420) may be any appropriate type of server or computer, such as a Unix or DOS-based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, real-time call management, etc. In one embodiment, real-time call management enables a user to perform several functions as a call is being received, such as sending a call to voice mail, sending a call received on one device to another device, manually initiating protection from telemarketers, playing an announcement for the caller, scheduling a call back, bridging a caller onto a current call, etc.

A communication portal server 408 may provide the hardware and software for managing a customer's account and interfacing with customer account information stored by the provider of customer's voice network 104. The network access servers 410 may provide the hardware and software for sending and receiving information to the voice network 104 in processing the applications provided by the service center. For example, the network access servers 410 may be used for transmitting and/or receiving information from/to an ISCP 302 or an SSP 308 or 310 of the voice network 104.

Voice portal 412 includes software and hardware for receiving and processing instructions from a customer via voice. For example, a customer may dial a specific number for voice portal 412. Then the customer using speech may instruct the service center 105 to modify the services to which the customer subscribes. Voice portal 412 may include, for example, a voice recognition function 416 and an application function 414. Voice recognition function 416 may receive and interpret dictation, or recognize spoken commands. Application function 414 may take, for example, the output from voice recognition function 416, convert it to a format suitable for service center 106 and forward the information to one or more servers (406, 408, 410) in service center 106.

Figure 5:
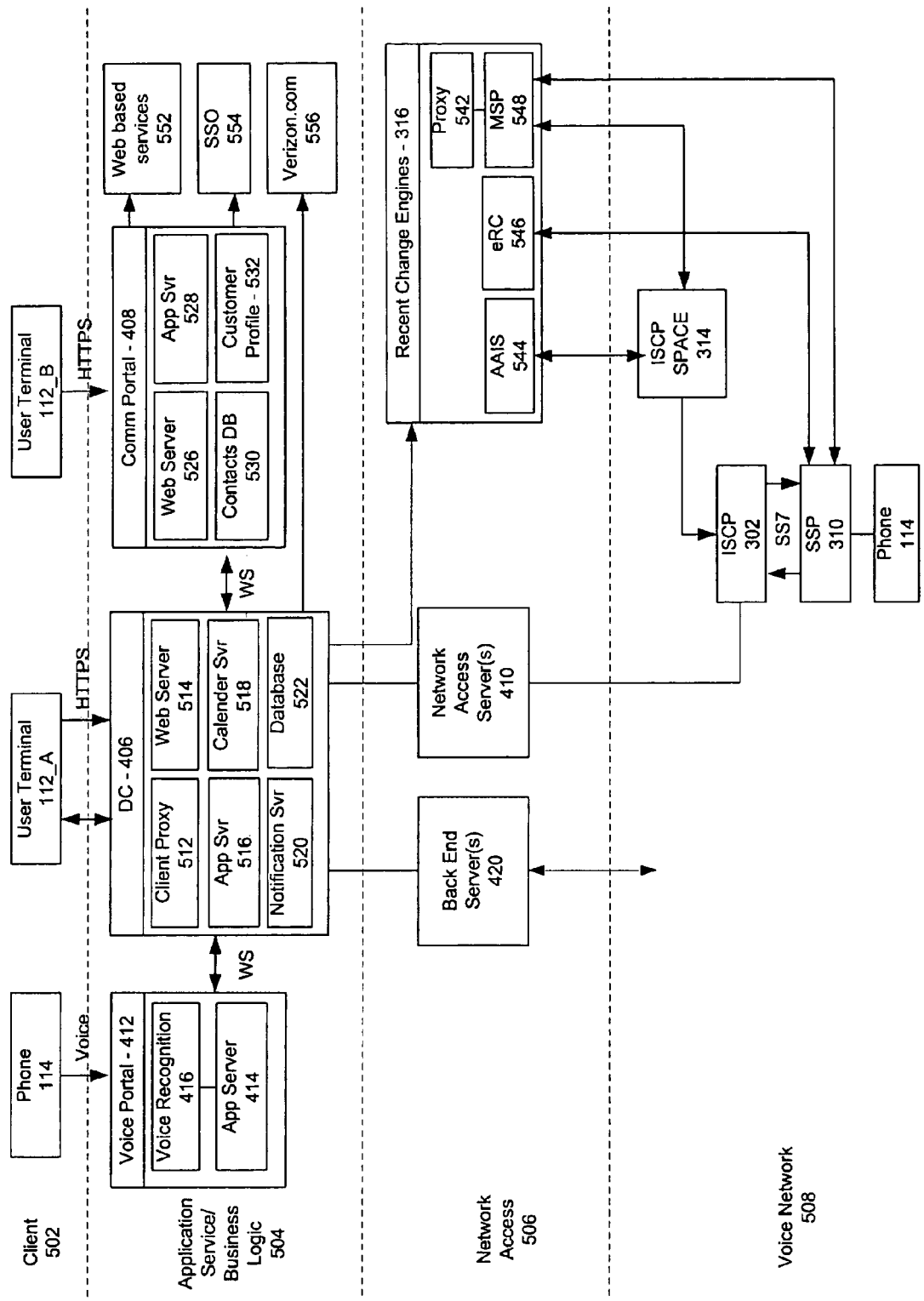
FIG. 5 illustrates a logical architecture of an exemplary system, consistent with the principles of the present invention.

FIG. 5 illustrates a logical architecture of an exemplary system, consistent with the present invention. As illustrated, the logical architecture may be split into four planes: client side plane 502, application service plane 504, network access plane 506, and voice network plane 508.

Client side plane 502 includes user terminals 112_A and 112_B that a user may use to send and/or receive information to/from service center 106. Additionally, client side plane 502 includes the user's phone(s) 114. As discussed above, user terminals 112 may be any type of device a user may use for communicating with service center 106. For example, user terminal 112_A may be a PDA running a program for communicating with service center 106, while user terminal 112_B may be a desktop type computer running a web browser for communicating with the service center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using XML, Simple Object Access Protocol ("SOAP"), Web Services Description Language ("WSDL") and Universal Description, Discovery and Integration ("UDDI") open standards over an Internet protocol backbone.

As illustrated, a digital companion server 406 may provide the following functions: a client proxy function 512, a web server function 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. Client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and the other digital companion servers to provide additional security.

Web server function 514 provides functionality for receiving traffic over data network 102 from a customer. For example, web server function 514 may be a standard web server that a customer may access using a web browser program, such as Internet Explorer or Netscape Communicator.

Application server function 516 encompasses the general functions performed by digital companion server(s) 406. For example, these functions may include interfacing with the various other digital companion functions to perform specific services provided by the service center. These services may include, for example, interfacing with other function(s), software, and/or hardware to provide a customer with the capability of managing their calls online. Such services may include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, enabling call management with user intervention in real-time, etc.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc. In one aspect of the invention, calendar server function 518 generates and maintains a scheduling data structure, such as a user calendar that includes scheduling events (e.g., meetings, tasks, etc.), that are created by the user through user terminal 112_A. For example, a user may schedule a conference call event in a calendar application reflecting a time and date when the user is to participate in a conference call that is be established in accordance with certain aspects related to the present invention. Calendar server function 518 may operate with, or leverage, application server function 516 to initiate conference call configuration processes consistent with aspects of the invention.

Notification server function 520 provides the capability to send information from the service center 106 to a user terminal 112. For example, the notification server function 520 at the direction of the application server function 516 may send a notification to the user terminal 112 that the user is presently receiving a phone call at the user's phone 114. This notification may be, for example, an instant message pop-up window that provides an identification of the caller as well as the number being called. The notification may also have a number of user-selectable buttons or items associated with it that enable the user to manage a call in real-time.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as for example, CD-ROMs, DVD's, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 514 of the digital companion servers, provides functionality for receiving traffic over data network 102 from a customer. For example, the web server may be a standard web server that a customer may access using a web browser, such as Internet Explorer or Netscape Communicator.

Application server function 528 encompasses the general functions performed by communication portal servers 408. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the Superpages web page. Application server function 528 could then contact these external services 552 to retrieve information, such as an address for a person in the user's address book.

In another example, application server function 528 of communication portal 408 may interface a Single Sign On ("SSO") server 554. SSO 554 may be used to allow users to access all services to which the user subscribes, on the basis of a single authentication that is performed when they initially access the network.

Moreover, application server function 528, similar to application server 516, may provide functionality to facilitate services performed by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, enabling call management with user intervention in real-time, etc.

Contacts database function 530 includes storage devices for storing an address book for the user. This address book may be any appropriate type of address book. For example, the user's address book may include the names, phone numbers, and addresses of people and/or organizations. These storage devices may be internal or external to communication portal servers 406 or some combination in between. In addition, these storage devices may be any type of storage device, such as magnetic storage, memory storage, etc.

Customer profile database function 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Application services plane 504 of the architecture may also include a voice portal 412. As discussed above, voice portal 412 may include, for example, a voice recognition function 416 and an application server function 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server function 414 of voice portal 412 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network access plane 506 of the architecture includes the functions for providing connectivity between application service plane 504 and voice network 104. For example, this plane may include recent change engines 316, network access servers 410, and/or back end servers 420.

As discussed above, recent change engines 316 may be used to update switches and ISCP databases included in the voice network 104. In one embodiment, recent change engines 316 may include an AAIS 544, an eRC 546, and/or an MSP 548. Additionally, a proxy 542 may be used between the digital companion servers 406 and recent change engines 542 for security purposes.

Network access servers 410 may be included in service center 106 and may provide the hardware and software for sending and receiving information to voice network 410 in processing the applications provided by the service center. For example, network access servers 410 may include a Caller ID ("CID") functionality for retrieving caller ID information from voice network 104, a Click To Dial ("CTD") functionality for instructing an intelligent peripheral in the voice network to place a call via an SSP, and/or a Real Time Call Management ("RTCM") functionality for interfacing with an ISCP of the voice network.

Network access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. This voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, these back end server(s) 420 may also include, for example, a directory assistance server. This directory assistance server may interface service center 106 with a Reverse Directory Assistance Gateway ("RDA Gateway") of the voice network 104. An RDA Gateway is a device for issuing requests to a Data Operations Center ("DOC") of voice network 104 for name and/or address information associated with a phone number and receiving the name and/or phone number in response to this request.

In another example, back end server(s) 420 may include a wireless internet gateway that is used for interfacing with a Mobile Switching center ("MSC") of a wireless voice network. As with the above-described back end server(s) 420, this wireless internet gateway may be used for converting requests and information between the formats used by service center 106 and those used by the wireless voice network.

In yet another example, back end server(s) 420 may include a Single Number Short Message Service ("SN SMS") server for interfacing service center 106 with a Short Message Service ("SMS") gateway in voice network 104. This may be used to permit the customer to have SMS messages addressed to their home phone number directed to an SMS capable device of the users choosing.

Also, back end server(s) 420 may include a conference server for instructing a conference bridge in voice network 104 to dial out via an SSP to the participants of a voice conference. Alternatively, for example, back end server(s) 420 may include a server for instructing an IP of the voice network to place a call between two parties by dialing out to each of the parties. The back end server(s) may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming server may buffer or record the signals to permit the user to pause, rewind, and/or fast-forward through the conference.

Voice network plane 508 includes the hardware and software included in voice network 104, as discussed above with reference to FIG. 3. For example, voice network plane 508 may include ISCP SPACE 314, ISCP 302, intelligent peripherals 320, and SSP 308. Additionally, voice network plane 508 may also include the hardware and software included in a wireless carrier's network, such as, for example, the mobile switching center, etc.

Conference Call Buffering System Overview

As explained, methods and systems consistent with certain aspects related to the present invention provide an environment from which a user may manage several different features associated with communicating over a telecommunications and/or information exchange network. Among those features are one or more conference call processes that automatically configure and maintain conference calls for a subscriber user through the subscriber user's scheduling calendar and/or address book. In one aspect of the invention, the conference call processes allow the initiating user to schedule a conference call event that includes one or more other conference users. The processes automatically establish a conference call between the users at the scheduled time and/or date scheduled by the subscriber user.

In addition, systems and methods consistent with the present invention digitize conference call audio and stream the audio to all users participating in the conference call at terminals associated with the users. Thereafter, a user participating in the conference call may access a recording of the conference call audio. The user may determine a duration of a replay of conference call audio. Moreover, the user may increase the speed of playback to more rapidly get up to speed on the content of the replay.

Figure 6:
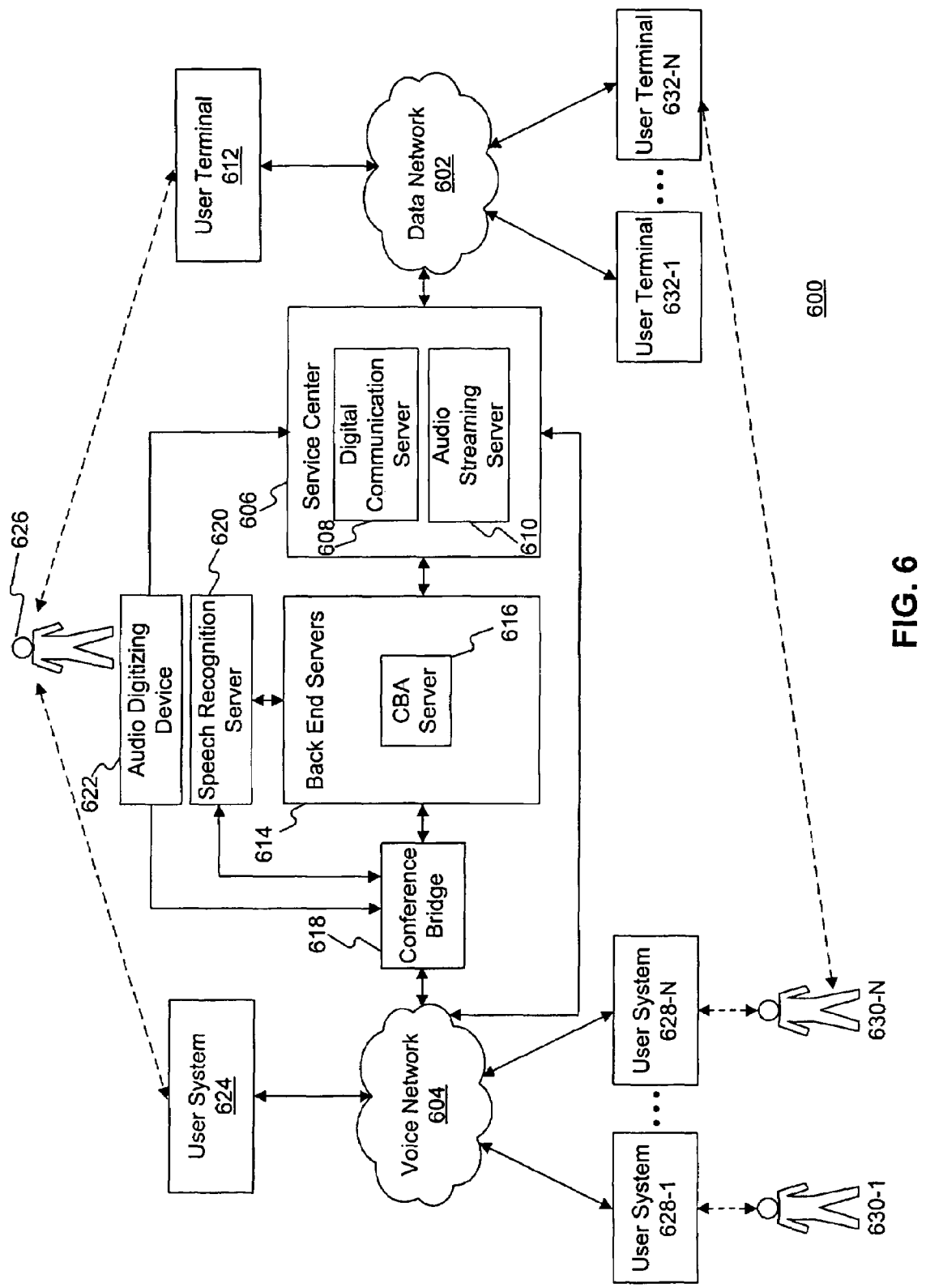
FIG. 6 is a diagram of an exemplary conference call buffering environment consistent with the principles of the present invention.

FIG. 6 shows an exemplary network environment 600 that performs conference call buffering processes consistent with certain aspects related to the present invention. As shown, environment 600 includes data network 602, voice network 604, service center 606, user terminal 612, back-end servers 614, conference bridge 618, speech recognition server 620, audio digitizing device 622, user system 624, user systems 628-1 to 628-N, and user terminals 632-1 to 632-N.

User terminal 612 may be a terminal operated by an initiating user 626 that is configured and operated in a manner consistent with user terminal 112 shown in FIG. 1. Data network 602 is a network that provides communications between various entities in environment 600, such as user terminal 612 and service center 606, in a manner consistent with data network 102 described above in connection with FIG. 1. Voice network 604 is a telephony-based network that provides communications between selected entities in environment 600 in a manner consistent with voice network 104 described above in connection with FIG. 1.

Service center 606 provides a platform for managing communications over data network 602 and voice network 604 in a manner consistent with service center 106 described above in connection with FIG. 1. In one aspect of the invention, service center 606 includes Digital Companion Server ("DCS") 608 that provides customer-related services in a manner consistent with digital companion server 406 described above in connection with FIGS. 4 and 5. One of ordinary skill in the art will recognize that service center 606 does not necessarily require DCS 608 in order to implement processes consistent with the present invention. Service center 606 may also include audio streaming server 610, which may be operable to receive digitized audio from audio digitizing device 622 and provide users participating in a conference call with a stream of digitized audio data. Audio streaming server 610 may be implemented using any suitable commercially available audio streamer, such as SHOUTcast server, RealServer, Windows Media Server, Quicktime Streaming Server, etc. One of ordinary skill in the art will recognize that audio streaming server 610 may alternatively be external to service center 606.

Back end servers 614 may be one or more computing systems that interface service center 606 and voice network 604. Back end servers 614 may include hardware and/or software and may operate in a manner consistent with back-end servers 420 described above in connection with FIG. 5. In one aspect of the invention, back end servers 614 may include a Conference Blasting Application ("CBA") server 616 that executes software to perform one or more conference call processes, including a process that generates messages used by environment 600 to set up a conference call associated with initiating user 626.

Conference bridge 618 is a network bridge that may establish communications between selected ones of conference users 630-1 to 630-N and initiating user 626. In one aspect of the invention, conference bridge 618 receives instructions from DCS 608 to set up conference calls in accordance with a conference call event configured by DCS 608. Further, conference bridge 618 provides telecommunication services associated with one or more calls during a conference call process.

Audio digitizing device 622 may be a device operable to receive analog audio data and convert it to digitized audio data. Audio digitizing device 622 may send such digitized audio data to service center 606, where audio streaming server 610 may process the data and provide an audio stream to various users. The analog audio data received by audio digitizing device 622 may be audio data from a conference call in which users are participating. The participating users may be the same users that receive the audio stream from audio streaming server 610. Audio digitizing device 622 may be implemented using any suitable commercially available analog to digital converter.

Speech recognition server 620 is a computing system that converts audio information provided by conference bridge 630 into speech information. Server 620 may transcribe the speech information into text data that is stored in one or more data storage devices (not shown). Additionally, speech recognition server 620 may be used in conjunction with the conference call buffering functions of the present invention to selectively playback or record a section of an audio stream, triggered by the recognition of a name or other word associated with a user participating in a conference call. In one aspect of the invention, speech recognition server 620 is located external to any components of environment 600. Alternatively, server 620 may be included as a server within back end servers 614.

User systems 628-1 to 628-N may be communication systems operated by respective conference users 630-1 to 630-N. Through user systems 628-1 to 628-N and voice network 604, conference users 630-1 to 630-N may communicate with each other using one or more types of communication devices. Accordingly, user systems 628-1 to 628-N may represent telephony based devices, such as wireline or wireless telephones. Alternatively, user systems 628-1 to 628-N may represent user terminals that operate in a manner consistent with user terminal 612. Initiating user 626 may also communicate with conference users 630-1 to 630-N through user system 624 and voice network 604. Moreover, conference users 630-1 to 630-N may use user terminals 632-1 to 632-N to communicate with other users in a manner similar to the use of user terminal 612 by initiating user 626. Accordingly, user terminals 632-1 to 632-N may operate in a manner similar to user terminal 612.

In one aspect of the invention, user 626 may be a subscriber to one or more services offered by service center 606. That is, user 626 may be a user that registers with a business entity associated with service center 606 to receive one or more communication services offered by the components of environment 600, such as service center 606. Exemplary services may include some or all of those mentioned in conjunction with service center 106. In one embodiment, one or more of users 630-1 to 630-N may also subscribe to such services.

Conference Call Buffering Processes

Figure 7:
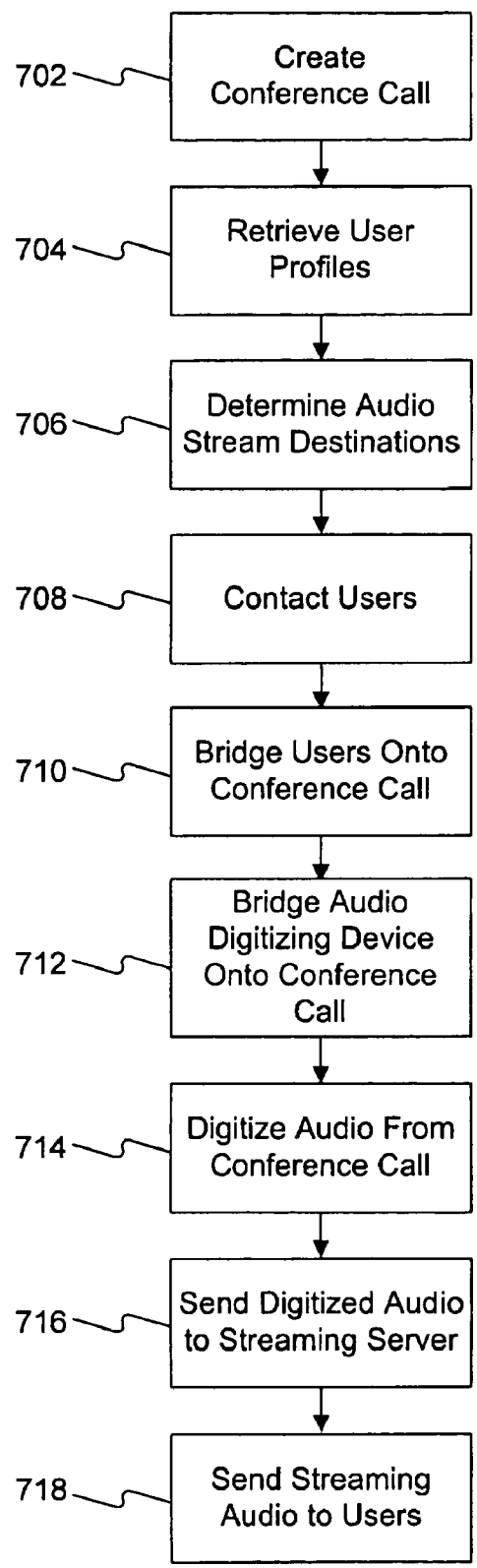
FIG. 7 is a diagram of an exemplary flowchart of a method for initiating a conference call that includes a buffering function consistent with the principles of the present invention.

Methods and systems consistent with certain aspects of the present invention automatically configure and maintain a conference call that includes a buffering function. FIG. 7 is a diagram of an exemplary flowchart of a method for initiating a conference call that includes a buffering function consistent with the principles of the present invention. Although the steps of the flowchart are described in a particular order, one skilled in the art will appreciate that these steps may be performed in a modified or different order. Further, one or more of the steps in FIG. 7 may be performed concurrently or in parallel.

First, service center 606 helps create a conference call (step 702). For example, initiating user 626 may set up one or more conference call scheduling events through user terminal 612 and service center 606. More particularly, initiating user 626 may access a calendar application and an address book provided by service center 606 to add participant users to a proposed conference call meeting. To do so, in one example, initiating user 626 may access conference user information displayed in a graphical representation of an address book corresponding to initiating user 626. Using an input device (e.g., a mouse, stylus, etc.), initiating user 626 may select profile information for a conference user (e.g., user 630-1) from the address book and drop it in a conference call icon included in the calendar application for a proposed time and date (e.g., Monday, Dec. 7, 2003, 9:00 AM EST). Alternatively, user 626 may select a date and time for a proposed conference call and add conference users to a participant list provided in graphical form on the display device in user terminal 612. In one aspect of the invention, service center 606 may employ an application server function (e.g., application server function 516) within DCS 608 to allow user 626 to schedule a conference call to take place at a specific time and date. One skilled in the art will appreciate, however, that different mechanisms and methods may be employed by environment 600 to enable user 626 to schedule a conference call with one or more conference users 630-1 to 630-N without departing from the scope of the invention. For example, instead of scheduling a computer-enhanced conference call for a future date and time, an initiating user may indicate that the computer-enhanced conference call should occur immediately.

Periodically, DCS 608 may scan the calendar application associated with user 626 to determine whether a conference call event is detected. The conference call event may act as a trigger that directs DCS 608 to automatically set up a conference call for user 626. For example, DCS 608 may determine whether a current date and time matches, or is within some predetermined range of, a scheduled conference call for user 626. For instance, suppose user 626 previously scheduled a conference call with three conference users listed in user 626's address book for a particular date (e.g., Monday, Nov. 17, 2003, at 10:00 AM EST). On that date and/or time (i.e., Nov. 17, 2003), or sometime earlier, a DCS 608 function, such as calendar service function 518, may trigger a conference call event that instructs DCS 608 to begin configuring a conference call in accordance with the particulars set up by user 626 and represented in the user's calendar. Alternatively, in the case of an immediate computer-enhanced conference call, application server 516 may detect a computer-enhanced conference call event as soon as the initiating user has submitted the required information. Such information may include, for example, identification of at least one conference user and an indication of whether the at least one conference user may participate in a collaboration.

Once a conference call event is detected, DCS 608 may generate a Conference Blasting Application ("CBA") message. The CBA message may include profile information for each conference user included in a participant list associated with the detected scheduled conference call. For example, DCS 608 may collect the telephone numbers and identifiers for each conference user and add them to the CBA message. Once the CBA message is generated, DCS 608 formats the message for an appropriate transmission protocol and sends the message to CBA server 616. In one aspect of the invention, DCS 608 may format the CBA message into an XML message and transmit the message to CBA server 616 using TCP/IP protocol. Other types of transmission protocols and information formats, however, may be implemented by service center 606 and DCS 608 to transport the CBA message to CBA server 616.

CBA server 616 may extract the information included in the CBA message to generate a CBA bridge message. A CBA bridge message is a set of commands that are directed to a specific bridge (e.g., conference bridge 618) that instructs the bridge to set up a conference call by dialing out to the conference users identified in the CBA message. In one aspect of the invention, CBA server 616 may determine which one of a plurality of bridges (not shown) in environment 600 is configured to handle conference call communications with any of users 630-1 to 630-N. CBA server 616 may identify conference bridge 618 as being dedicated to handle conference call operations and thus generate a CBA message based on the identification of bridge 618. That is, CBA server 616 may format a message that includes one or more commands directed to conference bridge 618.

Conference bridge 618 receives the CBA bridge message and, based on the commands included in the message, sets up a conference call that includes initiating user 626 and any conference users identified in the CBA bridge message. In one aspect of the invention, conference bridge 618 may collect the telephone number for the initiating user 626 and each conference user 630-1 to 630-N from the CBA bridge message.

In addition to helping create a conference call, service center 606 may also retrieve additional user profile information (step 704). Such user profile information may include information indicating where an audio stream associated with a conference call should be directed. For example, DCS server 608 may access a central storage area, such as database 522, and retrieve data corresponding to initiating user 626 and any conference users 630 that are invited to participate in the conference call created in step 702. One of ordinary skill in the art will appreciate that the additional user profile information may be stored local to each user instead of centrally. Based on the retrieved data, DCS server 608 may determine destinations for an audio stream associated with the conference call (step 706). The retrieved data may be, for example, Internet Protocol (IP) addresses, or similar identification, of user terminals 612 and 632 or other devices (not shown) associated with initiating user 626 and any conference users 630 that are invited to participate in the conference call. One of ordinary skill in the art will appreciate that it is possible for a destination device (e.g., a device that is to receive the audio stream) to be the same device used by a user to participate in a conference call.

In one embodiment, a user may designate which one of a plurality devices associated with the user is to receive the audio stream. Identification of this user designated device may be included in the data that is retrieved in step 704. Alternate methods of designating devices to receive an audio stream may also be used. For example, instead of the user designating which device to use, a system administrator or another conference user may designate the device. Additionally, a default device may be set as the device to receive an audio stream. Moreover, the determination of a device to receive an audio stream may be similar to the preferred device determination disclosed in U.S. patent application Ser. No. 10/720,633, which is herein incorporated by reference.

Once the conference call is configured, conference bridge 618 may use the collected telephone numbers to establish a connection with initiating user 626 and appropriate conference users 630-1 to 630-N (Step 708). In one aspect of the invention, conference bridge 618 may dial out to each user system 628-1 to 628-N operated by a conference user 630-1 to 630-N using the signaling protocols and/or components implemented by voice network 604, such as SCPs, SSPs, SCPs, ISCPs, SS7 protocol infrastructures, etc.

If a user does not answer the conference call from bridge 618, conference bridge 618 may generate and provide a NO CONTACT message to DCS 608 through CBA server 616. In one aspect of the invention, the NO CONTACT message may indicate to DCS 608 that the user did not answer the conference call. Additionally, the NO CONTACT message may also identify the user, the telephone number called, the time called, and any other type of information associated with the attempted conference call contact operation. DCS 608 may generate a DCS NO CONTACT message including some or all of the NO CONTACT message information provided by bridge 618, and send the DCS NO CONTACT message to user terminal 612 through data network 602. Alternatively, or additionally, DCS 608 may provide the DCS NO CONTACT message information to conference bridge 618 through CBA server 616. Bridge 618 may provide the NO CONTACT information to user 626 through user system 624 in, for example, voice format. In another aspect of the invention, conference bridge 618 may provide the NO CONTACT message information to user system 624 upon determining that the user did not answer the conference call. One skilled in the art will appreciate that the above described examples are not intended to be limiting and that methods and system consistent with aspects of the present invention may use other types of messages, information, and components to notify user 626 of the unanswered conference call.

Following the generation and provision of the no-contact message, conference bridge 618 may determine whether there are any more users included in the scheduled conference call that bridge 618 has not yet contacted. If so, bridge 618 attempts to establish contact with the new user(s). On the other hand, if conference bridge 618 has attempted to contact every participant user identified in the CBA bridge message for the conference call, and none of the users have answered the call (or communication could not be established for another reason), conference bridge 618 may generate a no conference call message to DCS 608 indicating that the scheduled conference call can not be processed because of the lack of users. In one aspect of the invention, DCS 608 may provide the no conference call message to user terminal 612 in a manner similar to that described above in connection with the NO CONTACT message. Further, bridge 618 may provide the no conference call message to user system 624 in a manner similar to that described above in connection with the NO CONTACT message.

If a user does answer the conference call, conference bridge 618 may generate and play or display one or more announcements to the user (via the user's corresponding user system or via the user's corresponding user terminal). The announcement may indicate to the participant user that the target participant user is scheduled to participate in a scheduled conference call. The announcement may also identify other conference users (e.g., 630-N) and the user initiating the conference call (e.g., initiating user 626). Other types of announcements may be provided by conference bridge 618 that include additional information associated with the conference call, such as subject of the call, a proposed agenda, etc. Also, additional messages may be provided to initiating user 626, such as a message indicating that a conference call has been configured in accordance with a scheduled conference call previously set up by user 626 through service center 606. Further, other components of environment 600 (shown or not shown in FIG. 6) may provide the one or more announcements to the participant user. That is, conference bridge 618 may leverage another processing component to provide conference call participant announcements to conference users 630-1 to 630-N.

Additionally, the announcements may be pre-configured and/or selected by user 626 using service center 606. In one example, when scheduling a conference call, user 626 may provide service center 606 with a pre-configured announcement that is used by conference bridge 618 when a participant user answers a conference call. In this instance, DCS 608 may include the pre-configured announcement in the CBA message provided to CBA server 616. And, in turn, CBA server 616 may include the pre-configured announcement message in the CBA bridge message provided to conference bridge 618. In another aspect of the invention, conference bridge 618 may provide a generic conference call announcement that is common to other conference calls established by bridge 618 prior to, during, or subsequent to, the conference call established for user 626 in the conference call process.

Upon answering the conference call, the user may have the option of accepting or not accepting the call. If the target participant user does not accept the conference call, conference bridge 618 may perform a participant feedback process that provides the user with one or more options for refusing the conference call. This participant feedback back process is described in detail in U.S. application Ser. No. 10/720,633, which is herein incorporated by reference.

If a user accepts the conference call, conference bridge 618 may generate and provide a participant user acceptance message to DCS 608. The acceptance message may include information reflecting the user's acceptance of the call. This information may also include information identifying the user, the status of the user's acceptance of the call, and any other type of information associated with the conference call and/or the user. For example, the acceptance message may include voice or text information indicating that the user has accepted the conference call and is joining in the conference initiated by DCS 608. The user may be identified by a conference call identifier, the user's name, and/or the user's telephone number. DCS 608 may forward this information to user 626 in the appropriate format through user terminal 612. Alternatively, or additionally, conference bridge 618 may provide the acceptance message to user 626 through user system 624 and voice network 604.

Once the user accepts the conference call, the user may participate in the conference with user 626 and any other conference users (630-1 to 630-N) that have also joined the call. For example, conference bridge 618 may bridge every user that accepts the conference call onto the conference call (step 710). And upon receiving notification that a given user accepts the conference call, conference bridge 618 may bridge the given user onto the call.

Conference bridge 618 also bridges audio digitizing device 622 onto the conference call (step 712). In this manner, audio digitizing device 622 may receive audio from the conference call for processing. More particularly, audio digitizing device 714 may digitize the audio from the conference call (step 714). Thereafter, audio digitizing device 622 may send the digitized audio to audio streaming server 610 (step 716). Upon receiving digitized audio, audio streaming device 610 may proceed to create a stream of the digitized audio. Audio streaming device 610 may also proceed to send the audio stream to all users that were invited to join the conference call, not just those users that have accepted the conference call (step 718). Specifically, audio streaming device 610 may utilize the information from steps 704 and 706 to establish communications with and send the audio stream to devices identified in step 706 via data network 602. In this manner, it is not necessary for a user to accept the conference call in order for a user terminal (e.g., a device corresponding to the user) to receive the audio stream.

Alternatively, audio streaming server 610 may send the audio stream to all users invited to the conference call expect those that have declined participation in the call. In this manner, users that do not wish to be involved in the conference call need not be bothered with the audio stream from the conference call. Moreover, audio streaming server 610 may not immediately send the audio stream to users. For example, audio stream server 610 may send the audio stream only to those users that request that they receive the audio stream. The audio stream may include data in formats such as MP3, RealAudio, Shockwave Flash, MPEG-4, Ogg Vorbis, or any other suitable format for streaming audio data.

Figure 8:
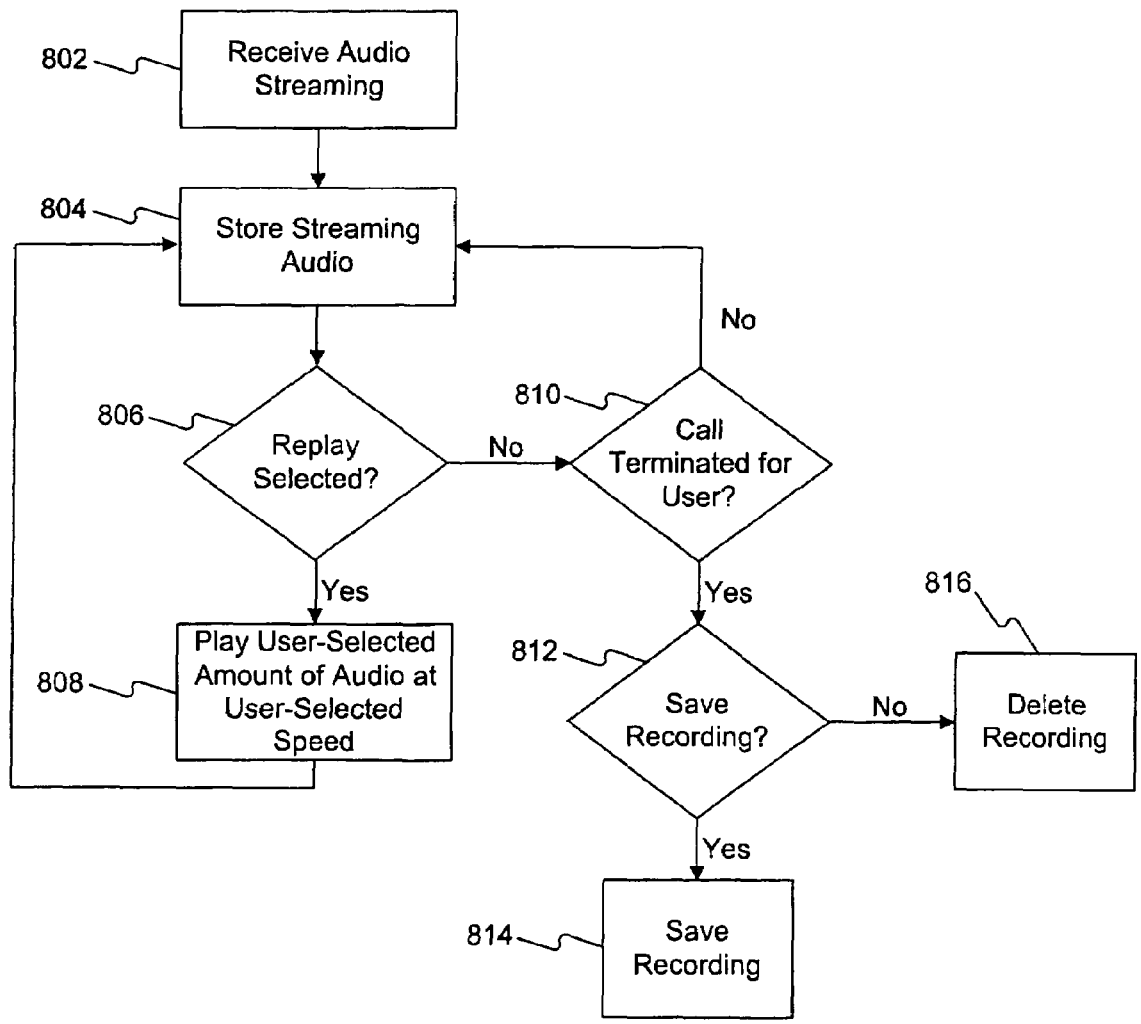
FIG. 8 is a diagram of an exemplary flowchart of a method for participating in a conference call that includes a buffering function consistent with the principles of the present invention.

FIG. 8 is a diagram of an exemplary flowchart of a method for participating in a conference call that includes a buffering function consistent with the principles of the present invention. Although the steps of the flowchart are described in a particular order, one skilled in the art will appreciate that these steps may be performed in a modified or different order. Further, one or more of the steps in FIG. 8 may be performed concurrently or in parallel.

As shown, a device, such as a user terminal 632 or 612, may receive an audio stream corresponding to a conference call that a user associated with the device has been invited to join (step 802). One of ordinary skill in the art will appreciate that the user may already be participating in the conference call or have yet to join the conference call. The device may include appropriate software operable to immediately or almost immediately play audio from the audio stream, if desired. Such software may include, but is not limited to, Winamp, RealPlayer, Sonique, XMMS, and Audion. Other players capable of playing streaming audio may alternatively be used.

The device receiving the audio stream may also store data contained in the streaming audio (step 804). For example, appropriate software may be used to directly record the actual audio stream or to first extract data from the audio stream and then record the extracted data. The extracted data may be processed before storing. Appropriate software may include, but is not limited to, Audio MP3 Sound Recorder, Super MP3 Recorder, or any recorder capable of receiving and storing data of an audio stream for later playback. The recording software may be resident in the device receiving the audio stream and may store the audio stream, for example, in a memory local to the device receiving the audio stream. One of ordinary skill in the art will appreciate that the audio stream may alternatively or additionally be stored in a central location, such as service center 606, and that the software for recording the audio stream may alternatively or additionally be resident in the central location.

In one aspect of the invention, local recording of the audio stream may occur automatically or be triggered manually. For example, recording software, instead of automatically recording an audio stream in a storage area local to a user, may initiate recording to local storage upon receiving a request to record locally from the user. In this manner, a user participating in a conference call may choose to start recording audio associated with the conference call when the user has to temporarily leave the conference call, has to momentarily not pay attention to the conference call, or has any other reason to initiate recording.

The recording software may continue to record the audio stream while the conference call proceeds. The recording software or different software associated with the device receiving the audio stream may make a determination as to whether a replay function has been selected (step 806). If not, then the device or service center 606 may determine whether the user associated with the device terminated the call from the perspective of the user (step 810). In other words, a determination is made whether the user left or is attempting to leave the conference call. If the user has not left the conference call, then the conference call proceeds as before, and the recording software continues to store the audio stream, as disclosed above with reference to step 804.

Upon the user ending participation, conference bridge 618 may generate and provide a user termination message to DCS 608. The termination message may include information identifying the user, the user's telephone number, a time that the user ended participation, and any other type of information bridge 618 may be programmed to provide upon the user terminating participation in the conference call. DCS 608 may provide the termination message to user 626 through user terminal 612. Alternatively, or additionally, conference bridge 618 may provide the termination message to user 626 through user system 624 and voice network 604.

Following the delivery of the termination message, the conference call process may end for the user. Environment 600 may, however, continue to execute the conference call process for any other remaining users until the conference call no longer includes any users. In one aspect of the invention, the conference call process may continue for conference users 630-1 to 630-N following termination of the call by user 626. Additionally, while the conference call is still established and includes at least one conference user 630 and/or user 626, any user may rejoin the call by contacting conference bridge 618 using a predetermined telephone number and/or conference identifier. Alternatively, user 626 may instruct conference bridge 618, through a CBA message generated by DCS 608, to contact a conference user 630 who previously terminated their participation in the call.

Returning to step 810, when the user did terminate the call, a determination may be made as to whether the recording of the audio stream should be saved (step 812). For example, service center 606 may send the user an interrogative asking whether the recorded audio should be saved. Such an interrogative may be displayed on the device receiving the audio stream or another device associated with the user. Alternatively, the device itself may generate the interrogative for the user.

If the user indicates that the recording should not be saved, then the recording software may proceed to delete the recording from storage local to the device receiving the audio stream (step 816). In a situation where the audio stream is alternatively or additionally stored centrally, the recording may not be deleted. If the user indicates that the recording should be saved, then the recording is maintained in storage local to the device receiving the audio stream (step 814). Alternatively, if the audio stream is only being stored in a central location during the conference call, then the recording is not finally saved in local storage. Regardless of whether the audio stream is being saved locally, centrally, or both, the recording may be saved in a central location, such as service center 606, when the user indicates that the recording should be saved in step 812.

Processing similar to steps 810-814 may occur when the conference call is terminated for all users. For example, each user remaining in the conference call at termination may decide whether a recording of the conference call should be locally maintained or deleted. Any central copy of the conference call audio may be saved in this situation. In one aspect of the invention, a system administrator or an initiating user, such as initiating user 626, may have the option of deleting the central copy at the end of the conference call.

Returning to step 806, if the user selects a replay option, then the device receiving the audio stream may proceed to play the recorded audio stream (step 808). For example, the recording software or a separate player (e.g., Winamp, RealPlayer, etc.) may access the stored audio stream and play audio from the conference call in accordance with user commands. Playback may be implemented in a number of ways. For example, the recording software or separate player may access audio stream data stored local to the device corresponding to the user and play the locally stored data. Alternatively, when a user selects a replay option, software on a device corresponding to the user may initiate a download of audio stream data stored in a central storage area. Thereafter, recording software or a separate player local to the device may play the downloaded audio stream data. One of ordinary skill in the art will appreciate that the downloading of audio stream data may be triggered by a separate download option, instead of a replay option. A user may then choose to play locally stored downloaded audio stream data at a later time using a replay option.

In one aspect of the invention, the user may designate a specific amount of the recording that should be played. For example, the user may indicate that the last N seconds or minutes of audio should be played. The user may make this indication, for example, before or after selecting the replay option. In this manner, the replay function may either use a preset length of time for audio replay, or it may await for additional input from the user before setting the length of time. One of ordinary skill in the art will appreciate that the last N seconds or minutes of audio do not necessarily need to be played. Instead, the user may designate any N seconds or minutes to be played.

Additionally, the user may designate a playback speed for the audio replay. For example, the user may indicate that audio replay should be double speed, thus enabling the user to more rapidly get up to speed on the content of the conference call. The user may make this indication, for example, before or after selecting the replay option. In this manner, the replay function may either use a preset speed for audio replay, or it may await for additional input from the user before setting the replay speed. One of ordinary skill in the art will appreciate that the user may designate other speeds other than double speed. As previously indicated, the recording software or a separate player may provide the functionality for playing the audio stream. This playback may include playback at an increased or decreased speed.

In one aspect of the invention, even though the device may be replaying audio, the device may be simultaneously continuing to receive and record the audio stream of the conference call. In this manner, the user may listen to a replay of some or all of the conference call without risking missing the portion of the conference call that occurs while the user listens to the replay. After the user is finished listening to the replay, the user may participate in the conference call as normal, while the device and/or service center continues to store the audio stream (step 804).

Conference Call Transcription and Speech Recognition Processes

Methods and systems consistent with certain aspects related to the present invention also enable voice communications during a conference call to be transcribed. In one aspect of the invention, conference bridge 618 may independently collect audio information from each channel of a conference call (i.e., audio signals received from each user system 628-1 to 628-N that are participating in a conference call). Bridge 618 may route the collected audio information to speech recognition server 620, which converts the audio information to speech information. Conference bridge 618 may directly route the audio information to server 620 or indirectly route the signals through back end servers 614 or other components of environment 600. Speech recognition server 620 may create a transcript of text data from the speech information that identifies each speaker (i.e., user 630-1 to 630-N and user 626) based on the speaker's communication connection established between voice network 604 and the speaker's corresponding user system 628-1 to 628-N. Speech recognition server 620 may also synchronize the transcript using time data that is encoded in the recorded audio information provided by conference bridge 618. In one aspect of the invention, speech recognition server 620 stores any audio information that cannot be converted to text data as audio files. Server 620 may insert pointers to the audio files in an appropriate location of the transcript. Thus, speech recognition server 620 may create a transcript that includes a sequence of text data that corresponds to the conversations between conference users 630-1 to 630-1 and user 626 during a conference call. The transcript may include, at some temporal based location in the transcript where text data could not be converted, a pointer to one or more audio files that includes non-converted audio information corresponding to a speaker that was talking during that moment in time reflected in the transcript.

Speech recognition server 620 may be configured to store the transcript in one or more storage devices located within server 620 or external to server 620. Further, speech recognition server 620 may format the transcript into a file that is provided to user 626's email address included in DCS 608. Alternatively, speech recognition server 620 may allow initiating user 626 to access the stored transcript through service center 606.

In one aspect of the invention, speech recognition server 620 or another speech recognizer may be used in conjunction with the conference call buffering functions of the present invention to selectively record a section of an audio stream, triggered by the recognition of a name or other word associated with a user participating in a conference call. For example, a user participating in a conference call may select a recording option that causes audio stream data associated with the conference call to be recorded for a period of time whenever speech recognition server 620 or another speech recognizer (e.g., speech recognition software local to the user) recognizes a name associated with the user during the conference call. Audio stream data stored in this manner may be stored centrally and/or locally. In this manner, a user may cause audio stream data to be stored that has a greater chance of being relevant to the user. One of ordinary skill in the art will appreciate that triggers other than a name of a user may be used to initiate recording.

In another aspect of the invention, speech recognition server 620 or another speech recognizer may be used in conjunction with the conference call buffering functions of the present invention to selectively playback a section of an audio stream, triggered by the recognition of a name or other word associated with a user participating in a conference call. For example, a user may select a replay option that causes software used for replaying audio to selectively playback a section of recorded audio stream data that corresponds to a name associated with the user. More particularly, as a conference call proceeds, a central or local speech recognizer a name associated with a particular user and cause an indicator to be inserted into any audio stream recording at an appropriate spot. The indicator may be reflective of a point in the audio stream that corresponds to the aforementioned name. The speech recognizer may place such indicators multiple times for one or more names consistent with the present invention. Thereafter, the software used for replaying audio may search for an appropriate indicator in determining which section of the audio stream should be played. The software may then play the appropriate section. In one aspect of the invention, a user selecting a replay option as described above may designate a specific amount of the recording that should be played.

For example, the user may indicate that N seconds before and after the first occurrence of the user's name should be replayed.

While the present invention has been described in connection with various embodiments, many modifications will be readily apparent to those skilled in the art. For example, while the present invention has been described as utilizing audio streams, one of ordinary skill in the art will appreciate that a stream that includes both audio and video data may be used. In this manner, a conference call consistent with the present invention may be a video conference call. The audio digitizing device and audio digitizing server may accordingly be adapted to handle both audio and video data.

One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A method comprising:
   establishing a conference call between a plurality of users, including an initiating user;
   ascertaining identities of a plurality of destination devices for an audio stream corresponding to the conference call, the destination devices corresponding to the plurality of users;
   providing the audio stream to the plurality of destination devices;
   storing the audio stream; and
   selectively deleting the stored audio stream, while the conference call is ongoing, based on a determination by a system that a user has exited the conference call.

2. The method of claim 1, wherein establishing a conference call comprises:
   detecting a conference call event that was previously configured by the initiating user; and
   contacting the plurality of users.

3. The method of claim 2, wherein establishing a conference call further comprises:
   receiving at least one response from the plurality of users; and
   bridging calls to devices corresponding to the plurality of users based on the at least one received response.

4. The method of claim 1, wherein ascertaining identities of a plurality of destination devices comprises:
   retrieving information pertaining to the plurality of users; and
   determining the plurality of destination devices based on the retrieved information.

5. The method of claim 1, wherein providing the audio stream comprises:
   connecting an audio digitizing device onto the conference call;
   digitizing analog audio corresponding to the conference call;
   converting the digitized audio to the audio stream; and
   sending the audio stream to the plurality of destination devices.

6. The method of claim 1, wherein storing the audio stream comprises:
   recording data contained in the audio stream in a central storage area.

7. The method of claim 6, wherein storing the audio stream further comprises:
   recording data contained in the audio stream local to at least one of the plurality of destination devices.

8. The method of claim 1, wherein storing the audio stream comprises:
   recording data contained in the audio stream local to at least one of the plurality of destination devices.

9. The method of claim 1, further comprising:
   replaying, at least one of the destination devices, a selected portion of the audio stream.

10. The method of claim 9, wherein replaying a selected portion comprises:
    playing a section of the stored audio stream for a user-selected period of time.

11. The method of claim 9, wherein replaying the selected portion comprises:
    playing the selected portion at a user-selected speed.

12. The method of claim 9, wherein replaying the selected portion comprises:
    playing a section of the stored audio stream for a user-selected period of time at a user-selected speed.

13. The method of claim 1, wherein selectively deleting comprises:
    deleting any stored audio stream data local to a user exiting the conference call based on a determination that the exiting user chooses a delete option; and
    saving any stored audio stream data local to the exiting user based on a determination that the exiting user chooses a save option.

14. The method of claim 9, wherein replaying the selected portion comprises:
    playing a section of the audio stream upon recognizing a name associated with a user.

15. The method of claim 1, wherein storing the audio stream comprises:
    recording the audio stream upon recognizing a name associated with a user.

16. A method comprising:
    establishing a conference call between a plurality of users, including an initiating user;
    identifying a plurality of destination devices for an audio stream corresponding to the conference call, the destination devices corresponding to the plurality of users;
    providing the audio stream to at least one of the identified destination devices; and
    storing data contained in the audio stream; and
    creating a text transcription of at least a portion of the stored audio stream data,
    wherein the audio stream is sent to a first destination device associated with one of the plurality of users invited to the conference call who declines to participate in the conference call.

17. The method of claim 16, wherein providing the audio stream comprises:
    sending the audio stream to at least one of the identified destination devices based on a request from a corresponding user.

18. The method of claim 16, wherein storing data contained in the audio stream comprises:
    recording data contained in the audio stream local to at least one of the identified destination devices based on a request from a corresponding user.

19. The method of claim 17, wherein storing data contained in the audio stream comprises:

recording data contained in the sent audio stream local to at least one of the identified destination devices based on a request from the corresponding user.

20. The method of claim 16, wherein storing data contained in the audio stream comprises:
recording data contained in the audio stream in a central storage area.

21. The method of claim 20, wherein providing the audio stream comprises:
downloading the audio stream data to at least one of the identified destination devices based on a request from a corresponding user.

22. The method of claim 16, further comprising replaying a selected portion of the stored audio stream data, wherein replaying the selected portion comprises:
downloading audio stream data corresponding to the selected portion to at least one of the identified destination devices; and
playing the downloaded audio stream data.

23. A method comprising:
establishing a conference call between a plurality of users, including an initiating user;
ascertaining identities of a plurality of destination devices for a stream corresponding to the conference call, the destination devices corresponding to the plurality of users;
providing the stream to the plurality of destination devices;
storing the stream;
replaying, at least one of the destination devices, a selected portion of the stream;
determining whether a user has exited the conference call; and
selectively deleting the stored stream, while the conference call is ongoing, based on a determination by a system that a user has exited the conference call.

24. A method comprising:
establishing a conference call between a plurality of users, including an initiating user;
providing an audio stream corresponding to the conference call to a plurality of destination devices, the destination devices corresponding to the plurality of users;
storing the audio stream; and
selectively deleting the stored audio stream, while the conference call is ongoing, based on a determination by a system that a user has exited the conference call.

25. The method of claim 24, wherein establishing a conference call comprises:
detecting a conference call event that was previously configured by the initiating user; and
contacting the plurality of users.

26. The method of claim 24, further comprising:
retrieving information pertaining to the plurality of users; and
determining the plurality of destination devices based on the retrieved information.

27. The method of claim 24, wherein providing the audio stream comprises:
converting digitized audio corresponding to the conference call to the audio stream; and
sending the audio stream to the plurality of destination devices.

28. The method of claim 24, wherein storing the audio stream comprises:
recording the audio stream in a central storage area.

29. The method of claim 28, wherein storing the audio stream further comprises:
recording the audio stream local to at least one of the plurality of destination devices.

30. The method of claim 24, wherein storing the audio stream comprises:
recording the audio stream local to at least one of the plurality of destination devices.

31. A method comprising:
receiving, from a service center, an audio stream corresponding to a conference call between a plurality of users including an initiating user;
storing the received audio stream;
determining whether a user has exited the conference call; and
selectively deleting the stored audio stream, while the conference call is ongoing, based on a determination by a system that a user has exited the conference call,
wherein the service center establishes the conference call between the plurality of users, ascertains identities of a plurality of destination devices for the audio stream corresponding to the conference call, and provides the audio stream to the plurality of destination devices.

32. The method of claim 31, wherein storing the audio stream comprises:
recording the audio stream in a local storage area.

33. The method of claim 31, further comprising:
replaying a selected portion of the audio stream.

34. The method of claim 33, wherein replaying the selected portion comprises:
playing a section of the stored audio stream for a user-selected period of time.

35. The method of claim 33, wherein replaying the selected portion comprises:
playing the selected portion at a user-selected speed.

36. The method of claim 33, wherein replaying the selected portion comprises:
playing a section of the stored audio stream for a user-selected period of time at a user-selected speed.

37. The method of claim 31, wherein selectively deleting comprises:
deleting any stored audio stream local to a user exiting the conference call based on a determination that the exiting user chooses a delete option; and
saving any stored audio stream local to the exiting user based on a determination that the exiting user chooses a save option.

38. The method of claim 31, wherein storing the audio stream comprises:
locally recording data contained in the audio stream based on a request from a user.

39. The method of claim 31, wherein storing the audio stream comprises:
downloading audio stream data from a central storage area; and
locally recording the audio stream data.

40. The method of claim 33, wherein replaying the selected portion comprises:
downloading audio stream data corresponding to the selected portion; and
playing the downloaded audio stream data.

41. A system comprising:
means for establishing a conference call between a plurality of users, including an initiating user;
means for ascertaining identities of a plurality of destination devices for an audio stream corresponding to the conference call, the destination devices corresponding to the plurality of users;

means for providing the audio stream to the plurality of destination devices;

means for storing the audio stream;

means for determining whether a user has exited the conference call; and means for selectively deleting the stored audio stream, while the conference call is ongoing, based on a determination by the system that a user has exited the conference call.

42. The system of claim 41, wherein the means for establishing a conference call comprises:

means for detecting a conference call event that was previously configured by the initiating user; and means for contacting the plurality of users.

43. The system of claim 42, wherein the means for establishing a conference call further comprises:

means for receiving at least one response from the plurality of users; and means for bridging calls to devices corresponding to the plurality of users based on the at least one received response.

44. The system of claim 41, wherein the means for ascertaining identities of a plurality of destination devices comprises:

means for retrieving information pertaining to the plurality of users; and means for determining the plurality of destination devices based on the retrieved information.

45. The system of claim 41, wherein the means for providing the audio stream comprises:

means for connecting an audio digitizing device onto the conference call;

means for digitizing analog audio corresponding to the conference call;

means for converting the digitized audio to the audio stream; and means for sending the audio stream to the plurality of destination devices.

46. The system of claim 41, wherein the means for storing the audio stream comprises:

means for recording the audio stream in a central storage area.

47. The system of claim 46, wherein the means for storing the audio stream further comprises:

means for recording the audio stream local to at least one of the plurality of destination devices.

48. The system of claim 41, wherein the means for storing contained in the audio stream comprises:

means for recording the audio stream local to at least one of the plurality of destination devices.

49. The system of claim 41, further comprising:

means for replaying, at least one of the destination devices, a selected portion of the audio stream.

50. The system of claim 49, wherein the means for replaying the selected portion comprises:

means for playing a section of the stored audio stream for a user-selected period of time.

51. The system of claim 49, wherein the means for replaying the selected portion comprises:

means for playing the selected portion at a user-selected speed.

52. The system of claim 49, wherein the means for replaying the selected portion comprises:

means for playing a section of the stored audio stream for a user-selected period of time at a user-selected speed.

53. The system of claim 41, wherein the means for selectively deleting comprises:

means for deleting any audio stream data stored local to a user exiting the conference call based on a determination that the exiting user chooses a delete option; and means for saving any audio stream data stored local to the exiting user based on a determination that the exiting user chooses a save option.

54. The system of claim 49, wherein the means for replaying the selected portion comprises:

means for playing a section of the audio stream upon recognizing a name associated with a user.

55. The system of claim 41, wherein the means for storing the audio stream comprises:

means for recording the audio stream upon recognizing a name associated with a user.

56. A system comprising:

means for establishing a conference call between a plurality of users, including an initiating user;

means for identifying a plurality of destination devices for an audio stream corresponding to the conference call, the destination devices corresponding to the plurality of users;

means for providing the audio stream to at least one of the identified destination devices; and means for storing data contained in the audio stream; and means for creating a text transcription of at least a portion of the stored audio stream data, wherein the audio stream is sent to a first destination device associated with one of the plurality of users invited to the conference call who declines to participate in the conference call.

57. The system of claim 56, wherein the means for providing the audio stream comprises:

means for sending the audio stream to at least one of the identified destination devices based on a request from a corresponding user.

58. The system of claim 56, wherein the means for storing data contained in the audio stream comprises:

means for recording data contained in the audio stream local to at least one of the identified destination devices based on a request from a corresponding user.

59. The system of claim 57, wherein the means for storing data contained in the audio stream comprises:

means for recording data contained in the sent audio stream local to at least one of the identified destination devices based on a request from the corresponding user.

60. The system of claim 56, wherein the means for storing data contained in the audio stream comprises:

means for recording data contained in the audio stream in a central storage area.

61. The system of claim 60, wherein the means for providing the audio stream comprises:

means for downloading the audio stream data to at least one of the identified destination devices based on a request from a corresponding user.

62. The system of claim 56, further comprising means for replaying a selected portion of the stored audio stream data, wherein the means for replaying the selected portion comprises:

means for downloading audio stream data corresponding to the selected portion to at least one of the identified destination devices; and means for playing the downloaded audio stream data.

63. A system comprising:

means for establishing a conference call between a plurality of users, including an initiating user;

means for ascertaining identities of a plurality of destination devices for a stream corresponding to the conference call, the destination devices corresponding to the plurality of users;

means for providing the stream to the plurality of destination devices;

means for storing the stream;

means for determining whether a user has exited the conference call; and means for selectively deleting the stored stream, while the conference call is ongoing, based on a determination by the system that a user has exited the conference call.

64. An apparatus comprising:

means for establishing a conference call between a plurality of users, including an initiating user;

means for providing an audio stream corresponding to the conference call to a plurality of destination devices, the destination devices corresponding to the plurality of users;

means for storing the audio stream;

means for determining whether a user has exited the conference call; and means for selectively deleting the stored audio stream, while the conference call is ongoing, based on a determination by the apparatus that a user has exited the conference call.

65. The apparatus of claim 64, wherein the means for establishing a conference call comprises:

means for detecting a conference call event that was previously configured by the initiating user; and means for contacting the plurality of users.

66. The apparatus of claim 64, further comprising:

means for retrieving information pertaining to the plurality of users; and means for determining the plurality of destination devices based on the retrieved information.

67. The apparatus of claim 64, wherein the means for providing the audio stream comprises:

means for converting digitized audio corresponding to the conference call to the audio stream; and means for sending the audio stream to the plurality of destination devices.

68. The apparatus of claim 64, wherein the means for storing the audio stream comprises:

means for recording the audio stream in a central storage area.

69. The apparatus of claim 68, wherein the means for storing the audio stream further comprises:

means for recording the audio stream local to at least one of the plurality of destination devices.

70. The apparatus of claim 64, wherein the means for storing the audio stream comprises:

means for recording the audio stream local to at least one of the plurality of destination devices.

71. An apparatus comprising:

means for receiving, from a service center, an audio stream corresponding to a conference call between a plurality of users including an initiating user;

means for storing the received audio stream;

means for determining whether a user has exited the conference call; and means for selectively deleting the stored audio stream based on a determination by the apparatus that a user has exited the conference call, while the conference call is ongoing, wherein the service center establishes the conference call between the plurality of users, ascertains identities of a plurality of destination devices for the audio stream corresponding to the conference call, and provides the audio stream to the plurality of destination devices.

72. The apparatus of claim 71, wherein the means for storing the audio stream comprises:

means for recording the audio stream in a local storage area.

73. The apparatus of claim 71, further comprising:

means for replaying a selected portion of the audio stream.

74. The apparatus of claim 73, wherein means for replaying the selected portion comprises:

means for playing a section of the stored audio stream for a user-selected period of time.

75. The apparatus of claim 73, wherein the means for replaying the selected portion comprises:

means for playing the selected portion at a user-selected speed.

76. The apparatus of claim 73, wherein the means for replaying the selected portion comprises:

means for playing a section of the stored audio stream for a user-selected period of time at a user-selected speed.

77. The apparatus of claim 71, wherein the means for selectively deleting comprises:

means for deleting any audio stream data stored local to a user exiting the conference call based on a determination that the exiting user chooses a delete option; and means for saving any audio stream data stored local to the exiting user based on a determination that the exiting user chooses a save option.

78. The apparatus of claim 71, wherein the means for storing the audio stream comprises:

means for locally recording data contained in the audio stream based on a request from a user.

79. The apparatus of claim 71, wherein the means for storing the audio stream comprises:

means for downloading audio stream from a central storage area; and means for locally recording the audio stream.

80. The apparatus of claim 73, wherein the means for replaying the selected portion comprises:

means for downloading audio stream corresponding to the selected portion; and means for playing the downloaded audio stream.

81. A computer-readable medium containing instructions for performing a method comprising:

establishing a conference call between a plurality of users, including an initiating user;

ascertaining identities of a plurality of destination devices for an audio stream corresponding to the conference call, the destination devices corresponding to the plurality of users;

providing the audio stream to the plurality of destination devices;

storing the audio stream;

determining whether a user has exited the conference call; and selectively deleting the stored audio stream, while the conference call is ongoing, based on a determination by a system that a user has exited the conference call.

82. A computer-readable medium containing instructions for performing a method comprising:

establishing a conference call between a plurality of users, including an initiating user;

providing an audio stream corresponding to the conference call to a plurality of destination devices, the destination devices corresponding to the plurality of users;

storing the audio stream;

determining whether a user has exited the conference call; and selectively deleting the stored audio stream, while the conference call is ongoing, based on a determination by a system that a user has exited the conference call.

83. A computer-readable medium containing instructions for performing a method comprising:

receiving, from a service center, an audio stream corresponding to a conference call between a plurality of users including an initiating user;

storing the received audio stream;

determining whether a user has exited the conference call; and selectively deleting the stored audio stream, while the conference call is ongoing, based on a determination by a system that a user has exited the conference call, wherein the service center establishes the conference call between the plurality of users, ascertains identities of a plurality of destination devices for the audio stream corresponding to the conference call, and provides the audio stream to the plurality of destination devices.

84. A system comprising:

a service center operable to establish a conference call between a plurality of users, including an initiating user, and to ascertain identities of a plurality of destination devices for an audio stream corresponding to the conference call, the destination devices corresponding to the plurality of users;

an audio streaming server operable to provide the audio stream to the plurality of destination devices; and a memory that stores the audio stream, wherein the stored audio stream is selectively deleted, while the conference call is ongoing, based on a determination by a system that a user has exited the conference call, and at least one of the destination devices is operable to replay a selected portion of the audio stream data, while the conference call is ongoing.

85. An apparatus comprising:

a first server operable to establish a conference call between a plurality of users, including an initiating user, and to ascertain identities of a plurality of destination devices for an audio stream corresponding to the conference call, the destination devices corresponding to the plurality of users;

a second server operable to provide the audio stream to the plurality of destination devices; and a memory that stores the audio stream, wherein the stored audio stream is selectively deleted, while the conference call is ongoing, based on a determination by the apparatus that a user has exited the conference call.

86. An apparatus comprising:

a memory having a program that: receives, from a service center, an audio stream corresponding to a conference call between a plurality of users including an initiating user; stores the received audio stream; replays a selected portion of the audio stream, while the conference call is ongoing; and selectively deletes the stored audio stream, while the conference call is ongoing, based on a determination by the apparatus that a user has exited the conference call, wherein the service center establishes the conference call between the plurality of users, ascertains identities of a plurality of destination devices for the audio stream corresponding to the conference call, and provides the audio stream to the plurality of destination devices; and a processor that runs the program.

* * * * *